United States Patent
Riviere

(10) Patent No.: US 11,746,680 B2
(45) Date of Patent: Sep. 5, 2023

(54) SYSTEM FOR MONITORING AN ENGINE

(71) Applicant: MAN ENERGY SOLUTIONS FRANCE, Saint-Nazaire (FR)

(72) Inventor: Frédéric Ghislain Patrice Riviere, Nort-sur-Erdre (FR)

(73) Assignee: MAN ENERGY SOLUTIONS FRANCE, Saint-Nazaire (FR)

( * ) Notice: Subject to any disclaimer, the term of this patent is extended or adjusted under 35 U.S.C. 154(b) by 0 days.

(21) Appl. No.: 17/767,673

(22) PCT Filed: Sep. 24, 2020

(86) PCT No.: PCT/HR2020/051660
§ 371 (c)(1),
(2) Date: Apr. 8, 2022

(87) PCT Pub. No.: WO2021/069811
PCT Pub. Date: Apr. 15, 2021

(65) Prior Publication Data
US 2023/0145029 A1    May 11, 2023

(30) Foreign Application Priority Data
Oct. 9, 2019  (FR) ...................... 1911183

(51) Int. Cl.
*F01M 11/10*   (2006.01)
*F02D 41/22*   (2006.01)

(52) U.S. Cl.
CPC .............. *F01M 11/10* (2013.01); *F02D 41/22* (2013.01); *F01M 2011/146* (2013.01);
(Continued)

(58) Field of Classification Search
CPC ........... F01M 11/10; F01M 2011/1413; F01M 2011/1446; F01M 2011/146;
(Continued)

(56) References Cited

U.S. PATENT DOCUMENTS

| 5,964,318 A | 10/1999 | Boyle et al. |
| 2004/0099050 A1 | 5/2004 | Matsiev et al. |

(Continued)

FOREIGN PATENT DOCUMENTS

| DE | 10 2013 005 003 | 9/2014 |
| FR | 3101916 B1 | 5/2022 |

(Continued)

OTHER PUBLICATIONS

Preliminary Search Report and Written Opinion for Application No. FR1911183, INPI, Jul. 6, 2020, 21 pages including translation.
(Continued)

*Primary Examiner* — Herbert K Roberts
*Assistant Examiner* — Anthony W Megna Fuentes
(74) *Attorney, Agent, or Firm* — Nixon & Vanderhye PC

(57) ABSTRACT

The invention relates to a monitoring system (SY1) for monitoring an engine (6) comprising: a sensor unit (U1) connected via an inlet line (12) to an oil circuit (C1) of the engine, the sensor unit comprising one or more sensors (SN) for measuring first parameters representative of the quality of an oil (OL) taken from the oil circuit; an analysis unit (U2) for establishing, based on the first parameters (PR1) or second parameters (PR2) obtained from the first parameters, whether at least one predefined condition (CN) is met, by comparing the first or second parameters with at least one threshold value; and a detection unit (U3) configured to detect a deterioration (EVT) of the quality of the oil representative of an abnormal state of the engine, if at least one predefined condition (CN) is met. The invention also relates to a corresponding method.

13 Claims, 15 Drawing Sheets

(52) U.S. Cl.
CPC ............... *F01M 2011/1413* (2013.01); *F01M 2011/1446* (2013.01); *F01M 2011/1473* (2013.01); *F02D 2250/11* (2013.01); *F16N 2200/04* (2013.01)

(58) Field of Classification Search
CPC ............. F01M 2011/1473; F02D 41/22; F02D 2250/11; F16N 2200/04
See application file for complete search history.

(56) References Cited

U.S. PATENT DOCUMENTS

| | | | |
|---|---|---|---|
| 2008/0302606 | A1 | 12/2008 | Alston |
| 2009/0139484 | A1* | 6/2009 | Harris ................. F01M 11/0458 184/7.4 |
| 2015/0082871 | A1* | 3/2015 | Zha .................... G01N 33/2888 73/53.05 |
| 2018/0051793 | A1 | 2/2018 | Ture et al. |
| 2019/0156600 | A1 | 5/2019 | Potyrailo et al. |

FOREIGN PATENT DOCUMENTS

| | | |
|---|---|---|
| JP | 5558337 | 7/2014 |
| WO | 2018/165302 | 9/2018 |

OTHER PUBLICATIONS

Response to Preliminary Search Report for Application No. FR1911183—Remarks, Sep. 9, 2020, 4 pages including translation.
Response to Preliminary Search Report for Application No. FR1911183—Amended Claims, Sep. 9, 2020, 20 pages including translation.
Research Report for Application No. FR1911183, INPI, Apr. 3, 2021, 4 pages including translation.
Notice of Publication for Application No. FR1911183, INPI, Apr. 3, 2021, 2 pages including translation.
Notice of completion of examination for Application No. FR1911183, INPI, Feb. 8, 2022, 2 pages including translation.
Notice of Issue for Application No. FR1911183, INPI, Apr. 23, 2022, 2 pages including translation.
Search Report and Written Opinion of FR Application No. 1911183 dated Jul. 6, 2020, 37 pages.
International Search Report for PCT/FR2020/051660 dated Jan. 12, 2021, 7 pages.
Written Opinion of the ISA for PCT/FR2020/051660 dated Jan. 12, 2021, 7 pages.

* cited by examiner

SYSTEM FOR MONITORING AN ENGINE

This application is the U.S. national phase of International Application No. PCT/FR2020/051660 filed Sep. 24, 2020 which designated the U.S. and claims priority to FR Patent Application No. 1911183 filed Oct. 9, 2019, the entire contents of each of which are hereby incorporated by reference.

TECHNICAL FIELD

The invention relates to the field of engine monitoring and more particularly to the detection of abnormal states likely to affect an engine when it is in use.

The invention is aimed in particular at detecting certain malfunctions, damage, deterioration and/or operating deviations that may affect an engine, with a view in particular to preventing them or treating them appropriately, and thereby maintaining the engine in operational condition.

PRIOR ART

Mechanical engines, such as internal combustion engines or electric motors, are found everywhere in modern industry and more generally in everyday appliances and machines. For example, a large number of vehicles (cars, trains, ships, etc.) or industrial devices are equipped with a mechanical engine to perform a given mechanical function (e.g., Rotating a vehicle's wheels).

In a manner well known in the art, an engine uses a source of energy (heat released by the internal combustion of a fuel or a source of electrical energy) to move at least one piston in a cylinder, this translation movement is transformed into rotation by a connecting crankshaft system. The rotation of the engine shaft is used to drive any equipment via a transmission mechanism.

Today, there are many different types of engines thanks to the progress made in the field over the years. The complexity of an engine can vary significantly depending on the application. In general, an engine can malfunction or break down during its operating life. In order to identify, and if possible prevent, breakdowns or malfunctions, and maintain an engine in operational condition, its condition must be carefully monitored.

In particular, regular maintenance should be performed on an engine to ensure that it is in good operational condition and, if necessary, to repair, replace or adjust certain parts or systems.

In particular, any deterioration, leaks, wear, breakages, operating malfunctions or others are likely to affect the proper functioning of an engine. For example, problems related to the fuel injection system can lead to dilution of the fuel in the lubricating oil and can cause the oil film to rupture, causing premature wear of mechanical parts, engine failure or even an engine explosion.

However, current monitoring and maintenance techniques do not sufficiently detect or identify certain malfunctions or abnormal conditions affecting an engine. In some cases these techniques will detect them late at the very best, which does not allow for effective treatment of the problem.

There is a need for a solution that can detect an abnormal condition in an engine at an early stage and identify the type of failure, malfunction, damage, anomaly or other condition affecting the engine so that the problem can be addressed quickly and effectively.

It is important generally to monitor the condition of an engine to determine if it is in operational condition or if its performance has deteriorated due to any malfunction. This monitoring should be easy, fast and reliable in order to perform effective engine maintenance.

DISCLOSURE OF THE INVENTION

To this end, this invention is for a monitoring system for monitoring an engine comprising:
  a sensor unit connected to an inlet line and an outlet line, the inlet line includes a hydraulic pipe connector configured to connect to the engine's oil circuit, the aforementioned sensor unit includes at least one sensor configured to measure first parameters representative of the quality of an engine lubricating oil taken from the oil circuit via the inlet line, the outlet line being adapted to discharge oil from the sensor unit into the oil circuit;
  an analysis unit configured to determine, from the first parameters or second parameters obtained by processing the first parameters, whether at least one predefined condition is met, by comparing these first or second parameters with at least one threshold value; and
  a detection unit configured to detect any deterioration of the oil quality representative of an abnormal state of the engine, if at least one predefined condition is met.

The invention enables the condition of a mechanical engine to be monitored from the quality of the oil circulating in the oil circuit of the engine. By measuring parameters representative of the quality of the oil, the system of the invention is able to detect possible deterioration and/or pollution of the quality of the oil, which would indicate an abnormal condition of the engine. This monitoring can be carried out continuously, or periodically or regularly, so as to monitor the operational state of the engine while it is running.

The invention makes it possible to detect at an early stage (or even in real time) any malfunctions, anomalies, damage, operating deviations or other problems that an engine may encounter during its life cycle.

In particular, the invention makes it possible to check whether an engine is in operational condition or whether its performance has deteriorated due to any malfunction. Thanks to the invention, it is possible to easily, quickly and reliably monitor an engine, allowing for efficient maintenance of the engine if needed.

According to a particular embodiment, the monitoring system comprises a control unit set up to initiate at least one predefined action to secure the engine if at least one oil quality deterioration is detected.

According to a particular embodiment, this one action will include at least any one of the following:
  Sending or presenting an oil quality deterioration notification; and
  initiating a command from a control unit to change at least one engine operating parameter.

According to a particular embodiment, the first parameters measured by at least one sensor comprise at least the following parameter: relative oil humidity. In other words, at least the relative humidity of the oil is measured as a first parameter, possibly in combination with one or more other first parameters, for example among those mentioned below.

According to a particular embodiment, the first parameters measured by at least one sensor comprise at least the following parameters:
  electrical conductivity of the oil;
  dielectric constant of the oil;

temperature of the oil;

oil pressure; and relative humidity of the oil.

According to a particular embodiment, the first parameters include at least one parameter characterizing metallic particles that may be present in the oil.

According to a particular embodiment, the processing performed by the analysis unit comprises at least one of the following:

determining, as a second parameter, a corrected electrical conductivity from the electrical conductivity measured by at least one sensor by applying a first final polynomial function, the first final polynomial function defines the corrected electrical conductivity based on the electrical conductivity, the temperature, pressure and relative humidity measured by at least one sensor. This first final polynomial function is weighted by first coefficients associated respectively with the temperature, pressure and relative humidity to compensate at least in part for the respective influence of the temperature, pressure and relative humidity on the electrical conductivity measured by at least one sensor; and determining, as a second parameter, a corrected dielectric constant from the dielectric constant measured by at least one sensor by applying a second final polynomial function, the second final polynomial function defines the corrected dielectric constant based on the dielectric constant, the temperature, pressure and relative humidity measured by at least one sensor. This second final polynomial function is weighted by first coefficients associated respectively with the temperature, pressure and relative humidity to compensate at least in part for the respective influence of the temperature, pressure and relative humidity on the dielectric constant measured by at least one sensor;

wherein the analysis module is configured to compare at least one of the corrected electrical conductivity and the corrected dielectric constant with a respective threshold to determine whether the at least one predefined condition is met.

According to a particular embodiment, the analysis module is configured to determine the corrected electrical conductivity and the corrected dielectric constant during this processing, where at least one predefined condition includes the following conditions:

the corrected dielectric conductivity reaches a first threshold; and the corrected dielectric constant reaches a second threshold.

According to a particular embodiment, the monitoring system comprises a calibration unit configured to determine, prior to the analysis, the first and second coefficients weighting respectively the first and second final polynomial functions. This calibration unit is configured to perform the following steps:

determining a first polynomial function f1CE-T representing the change in the electrical conductivity measured by at least one sensor as a function of the temperature measured by at least one sensor;

determining a first polynomial function f1CE-P representing the change in the electrical conductivity measured by at least one sensor as a function of the pressure measured by at least one sensor;

determining a first polynomial function f1CE-HR representing the change in the electrical conductivity measured by at least one sensor as a function of the relative humidity measured by at least one sensor;

determining a first polynomial function f1CD-T representing the change in the dielectric constant measured by at least one sensor as a function of the temperature measured by at least one sensor;

determining a first polynomial function f1CD-P representing the change in the dielectric constant measured by at least one sensor as a function of the pressure measured by at least one sensor;

determining a first polynomial function f1CD-HR representing the change in the dielectric constant measured by at least one sensor as a function of the relative humidity measured by at least one sensor;

using the first polynomial function f1CE-T to determine a second polynomial function f2CE-T defining a correction CRCE-T of the electrical conductivity as a function of the temperature. This second polynomial function f2CE-T is weighted by the first coefficients defining the correction CRCE-T so that it is zero at a reference temperature;

using the first polynomial function f1CE-P to determine a second polynomial function f2CE-P defining a correction CRCE-P of the electrical conductivity as a function of the pressure. This second polynomial function f2CE-P is weighted by the first coefficients defining the correction so that it is zero at a reference pressure;

using the first polynomial function f1CE-HR to determine a second polynomial function f2CE-HR defining a correction CRCE-HR of the electrical conductivity as a function of the relative humidity. This second polynomial function f2CE-HR is weighted by the first coefficients defining the correction so that it is zero at a reference relative humidity;

using the first polynomial function f1CD-T to determine a second polynomial function f2CD-T defining a correction CRCD-T of the dielectric constant as a function of temperature. This second polynomial function f2CD-T is weighted by the second coefficients defining the correction so that it is zero at the reference temperature;

using the first polynomial function f1CD-P to determine a second polynomial function f2CD-P defining a correction CRCD-P of the dielectric constant as a function of pressure. This second polynomial function f2CD-P is weighted by the second coefficients defining the correction so that it is zero at the reference pressure; and using the first polynomial function f1CD-HR to determine a second polynomial function f2CD-HR defining a CRCD-HR correction of the dielectric constant as a function of relative humidity. This second polynomial function f2CD-HR is weighted by the second coefficients defining the correction so that it is zero at the reference relative humidity;

wherein the analysis module is configured to apply these first and second coefficients in the final first and second polynomial functions, respectively, to determine upon processing the corrected electrical conductivity and the corrected dielectric constant as second parameters.

According to a particular embodiment, the analysis module is configured to perform the following during a learning phase:

determining a corrected initial electrical conductivity and a corrected initial dielectric constant from, respectively, the electrical conductivity and the dielectric constant measured by at least one sensor in a reference state of the oil circuit;

wherein the analysis module is further configured to perform, during this processing:

calculating a first deviation between a corrected electrical conductivity determined at a current time from the corrected initial electrical conductivity and a second deviation between a corrected dielectric constant determined at a current time from the corrected initial dielectric constant; and determining that at least one predefined condition is met if at least one of the first and second deviations reaches a predefined threshold.

According to a particular embodiment, the monitoring system is such that:

if the first deviation reaches a first predefined minimum threshold, the detection module is configured to detect, as a deterioration of oil quality, an abnormal viscosity level of the oil;

if the first deviation reaches a second predefined maximum threshold, the detection module is configured to detect, as a deterioration of the quality of the oil, a fuel pollution of the oil;

if the second deviation reaches a third predefined minimum threshold, the detection module is configured to detect, as a deterioration of the quality of the oil, soot pollution of the oil; and if the second deviation reaches a fourth predefined maximum threshold, the detection module is configured to detect, as a deterioration of the oil quality, an anomalous alkalinity level of the oil.

According to a particular embodiment, the monitoring system is such that:

if the first deviation reaches a fifth predefined maximum threshold and if the second deviation reaches a sixth predefined minimum threshold, the detection module is configured to detect, as a deterioration of the oil quality, a light fuel oil pollution of the oil;

if the first deviation reaches a predefined maximum seventh threshold and the second deviation reaches a predefined maximum eighth threshold, the detection module is configured to detect as a deterioration of the oil quality a heavy fuel pollution of the oil; and if the relative humidity reaches a ninth predefined maximum threshold, if the first deviation reaches a tenth predefined maximum threshold and if the second deviation reaches an eleventh predefined maximum threshold, the detection module is configured to detect, as a deterioration of the quality of the oil, an anomalous iron content of the oil.

The invention also relates to an engine system comprising:

an oil circuit with an engine, a pump for injecting an engine lubricating oil into this engine, and a sump for collecting the engine lubricating oil discharged from the engine; and a monitoring system as defined herein, the connector of the inlet line is connected to the oil circuit so as to sample engine lubricating oil flowing in this oil circuit, and wherein the outlet line is configured to discharge the lubricating oil into the sump.

According to a particular embodiment, the oil circuit further comprises an oil filter positioned between the pump and the engine, the connector of the inlet pipe is connected to the oil circuit at a tapping point located:

between the pump and the oil filter so as to be downstream of the pump and upstream of the engine; or between the pump and the engine so as to be downstream of the engine and upstream of the pump.

The invention also relates to a corresponding monitoring method implemented by a monitoring system as defined herein. More particularly, the invention relates to a method for monitoring an engine, implemented by a monitoring system with at least one sensor and connected via an inlet line to the engine's oil circuit. This method performs the following:

measuring, by at least one sensor, first parameters representative of the quality of an engine lubricating oil taken from the oil circuit via the inlet line, the oil is discharged after the measurement into the oil circuit via one of the monitoring system's outlet line;

an analysis based on the first parameters or second parameters obtained by processing the first parameters to determine whether at least one predefined condition is met, by comparing these first or second parameters with at least one threshold value; and detection of at least one predefined deterioration of the oil quality representative of an abnormal state of the engine if at least one predefined condition is met.

It should be noted that the different embodiments mentioned herein in relation to the monitoring system and to the engine system of the invention as well as the associated advantages apply similarly to the monitoring method of the invention.

According to one embodiment, the invention is implemented by means of software and/or hardware components. For this purpose, the term "unit" (which may also be called "module") may correspond in this document to both a software component, a hardware component or a set of hardware and software components.

For each step of the monitoring process, the electronic device of the invention may include a corresponding unit configured to perform this step.

In a particular embodiment, the various process steps implemented by the analysis unit, by the detection unit, by the control unit, by the command unit and by the calibration unit are determined by computer program instructions.

Accordingly, the invention is also directed to a computer program on a data carrier (or recording system). This program is capable of being implemented in a monitoring system or more generally in a computer, this program includes instructions on implementing certain steps of a monitoring process as defined herein.

This program may use any programming language and be in the form of source code, object code or code intermediate between source code and object code, such as in a partially compiled form, or in any other desirable form.

The invention is also directed to a computer-readable data carrier (or recording system) including instructions for a computer program as mentioned above.

The data carrier may be any entity or device capable of storing the program. For example, the carrier may include a storage device, such as a ROM, e.g., a CD-ROM or a microelectronic circuit ROM, or a magnetic recording system, e.g., a floppy disk or a hard disk.

On the other hand, the data carrier may be a transferable system such as an electrical or optical signal, which may be conveyed via an electrical or optical cable, by radio or by other means. The program according to the invention can be downloaded on an Internet-type network.

Alternatively, the data carrier may be an integrated circuit in which the program is incorporated. The circuit would be adapted to execute or to be used in the execution of the process in question.

BRIEF DESCRIPTION OF THE DRAWINGS

Further features and advantages of this invention will be apparent from the description made below, with reference to the attached drawings which illustrate non-limiting example embodiments thereof. In the figures.

DESCRIPTION OF THE EMBODIMENTS

As mentioned above, the invention relates to monitoring an engine operating in an oil circuit.

The invention is a way to effectively monitor an engine by means of a monitoring system (also called a management system or control system) comprising a sensor unit, an analysis unit and a detection unit. The sensor unit is connected to an inlet line that includes a hydraulic piping connector configured to connect to one of the engine's oil circuits. The sensor unit also includes at least one sensor configured to measure first parameters representative of the quality of an engine lubricating oil drawn from the oil circuit via the inlet line. The analysis unit is configured to determine from the first parameters, or from second parameters obtained by processing the first parameters, whether at least one predefined condition is met. To do so, the analysis unit can compare these first or second parameters with at least one threshold value. The detection unit can detect at least one deterioration of the oil quality representative of an abnormal state of the engine, if at least one predefined condition is met.

By monitoring the quality of the oil circulating in the oil circuit of an engine while it is running, it is possible to follow the condition of the engine continuously and to detect, identify and if necessary treat any failures or abnormal conditions that may affect the engine.

The invention also relates to a corresponding monitoring method (or management method, or control method), to a corresponding computer program and to a data carrier which includes such a program.

Further aspects and advantages of this invention will become apparent from the example embodiments described below with reference to the aforementioned drawings.

In this document, examples of implementation of the invention are described in the context of an internal combustion engine, such as a diesel engine or a gasoline engine or a gas engine, for example. As understood by the skilled person, however, the invention is not limited to these specific cases and applies more generally to the monitoring and control of all mechanical engines, in particular internal combustion engines (or heat engines) and electric motors. The invention can be applied, for example, to the monitoring and control of a diesel or gas engine.

Unless otherwise indicated, elements common to or similar to several figures bear the same reference signs and have identical or similar characteristics, so that these common elements are generally not described again for the sake of simplicity.

Figure 1:
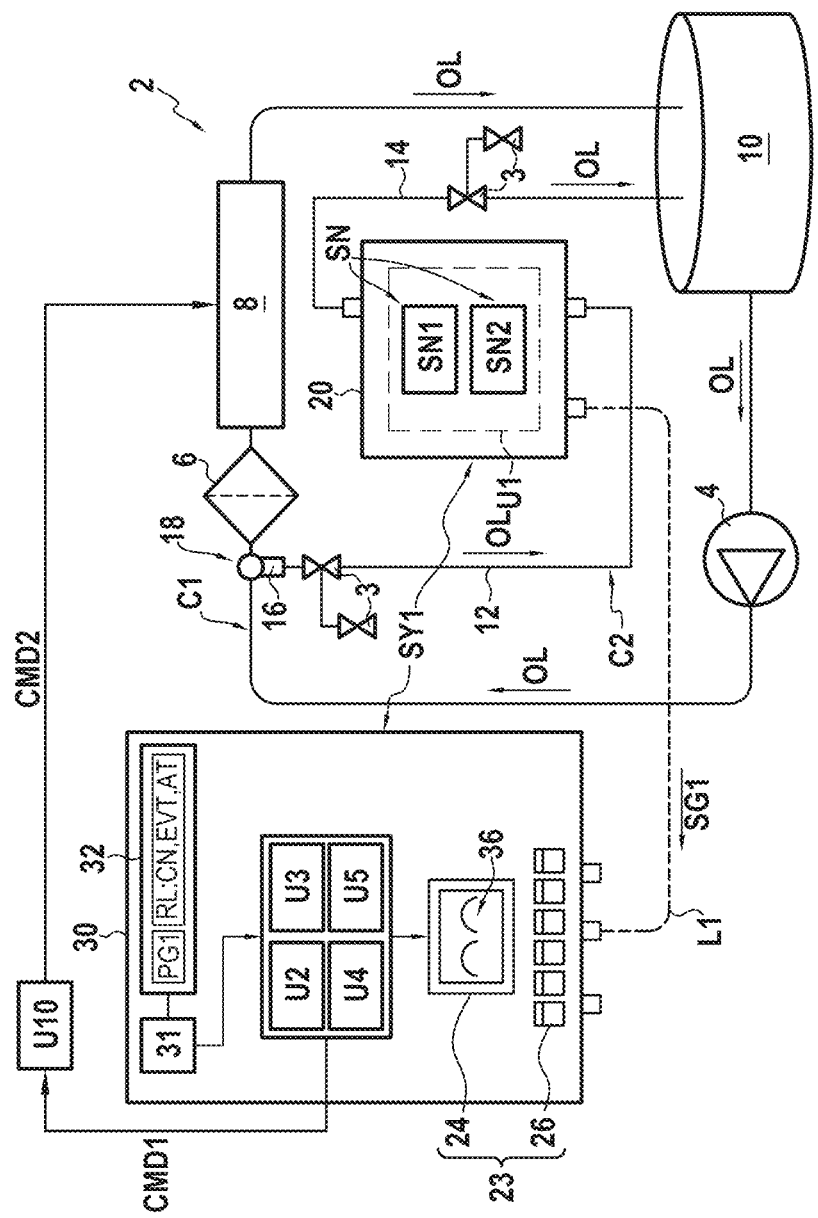
FIG. 1 schematically represents the structure of a monitoring system and an engine system according to a particular embodiment of the invention.

FIG. 1 schematically shows the structure of a monitoring system SY1 and an oil circuit C1, following a particular embodiment. The monitoring system SY1 and the oil circuit C1 are configured to cooperate with each other and form a system 2.

More specifically, the oil circuit C1, referred to as the main oil circuit, comprises a mechanical engine 8 (hereinafter referred to as "engine"), a pump 4 for injecting an engine lubricating oil OL (hereinafter referred to as "oil") into the engine 8, and a sump 10 for collecting the engine lubricating oil OL discharged from the engine 8. The oil circuit C1 further includes an oil filter 6 positioned upstream of the engine 8 to filter out contaminants, sludge, soot or the like that may be present in the OL oil before the oil enters the engine 8. In this example, the filter 6 is positioned between the pump 4 and the engine 8.

It is assumed in this example that the engine 8 is an internal combustion engine, for example a diesel or gas engine, however other examples of mechanical engines could be used.

The pump 4 is configured to circulate the oil OL at high pressure (here at a pressure between 0 and 10 bar), with a flow rate between 0 and 800 m$^3$/h, for example, 7 bar at 54 m$^3$/h. It is understood, however, that the operating configuration of the main oil circuit C1, particularly in terms of pressure and flow rate, can be adapted on a case-by-case basis.

Furthermore, the lubricating oil OL is an oil resistant to the pollution of a combustion engine such as engine 8 in this case.

The general system 2 also has a secondary oil circuit C2 forming a bypass connected to the main oil circuit C1 at a tapping point 18. More specifically, the secondary oil circuit C2 is an analysis circuit which in this example has an inlet pipe 12, a sensor unit (or measurement unit) U1 and an outlet pipe 14.

The purpose of the monitoring system SY1 is to monitor the condition of the engine 8 while it is running, to detect and identify abnormal conditions (breakdowns, damage, malfunctions, etc.) that may affect the engine 8, and to possibly secure the engine to ensure that it remains in operating condition.

The monitoring system (also called system) SY1 comprises a sensor unit U1 (already mentioned above), an analysis unit U2, a detection unit U3, and possibly a control unit U4 and/or a calibration unit U5. Other embodiments are however possible, in particular without the control unit U4 and/or without the calibration unit U5.

In this example, the sensor unit U1 is housed in a first housing (or first device) 20 while the units U2, U3, U4 and U5 are housed in a second housing (or second device) 30 remote from the first housing 20. The calibration unit U5 may optionally be located outside the housings 20 and 30. These two housings 20 and 30 are connected by a communication link L1 which allows the sensor unit U1 to send sensor signals SG1 to the analysis unit U2, as explained below. However, other implementation methods are possible in which the units U1-U5 are, for example, arranged together in a single housing or are arranged differently in several housings or devices.

The sensor unit U1 is connected to the inlet line 12 and the outlet line 14. The inlet line 12 includes a hydraulic piping connector 16 (also called a connection) configured to connect to the oil circuit C1 of the engine 8. The connector 12 has mechanical features to attach to the main oil circuit C1 at the tapping 18 and to withstand the temperature and pressure conditions in the main oil circuit C1. It may be a flexible hydraulic pipe connector or a rigid hydraulic pipe connector, case dependent. The connector 16 may be made of steel or a stainless steel material to resist corrosion (especially in underwater environments). The connector 16 is, for example, a watertight fitting such as 15 L or similar. As shown in FIG. 1, a shut-off valve system 3 can be optionally coupled to the connector 16 or to the inlet line 12 to isolate and drain the system if needed for any intervention.

In this example, the tapping point 18 at which the connector 16 connects to the main oil circuit C1 is located between the oil filter 6 and the pump 4, although other positions are possible.

The sensor unit U1 includes at least one sensor SN configured to measure first parameters PR1 representative of the quality of a lubricating oil OL taken from the main oil circuit C1 via the inlet pipe 12, more precisely at tapping point 18 in this example. It is assumed in this example that the sensor unit U1 comprises two (2) sensors SN1, SN2 configured to measure first parameters PR1. The number and nature of the sensors may vary depending on the case.

Generally speaking, the sensors SN1 and SN2 are arranged in bypass in the secondary oil circuit C2 to measure the first parameters PR1 on the oil OL taken from the main circuit C1 at the level of tapping point 18, while engine 8 is running, or at least while the oil OL is circulating in the main oil circuit C1.

The bypass positioning of the sensor unit U1 is beneficial since it allows only a portion of the OL oil flow circulating in the main oil circuit C1 to be tapped and means that it is possible to maintain a lower oil flow rate in the secondary oil circuit C2 than in the main oil circuit C1. In particular, by adjusting the connector 16 accordingly, the oil flow rate can be adjusted to enable a more effective measurement of the quality of the oil OL. In the example considered here, the oil flow rate is, for example, a maximum of 600 m$^3$/hour in the main oil circuit C1 and a maximum of 0.6 m$^3$/hour in the secondary oil circuit C2. In addition, the bypass configuration makes it possible to isolate the secondary oil circuit C2 if necessary and to perform any necessary intervention (installation, maintenance, etc.) on the monitoring system SY1 without disturbing the operation of the main oil circuit C1.

The SN sensors (also known as "oil condition sensors") allow the quality of the engine oil OL circulating in the main oil circuit C1 to be evaluated regularly, or even continuously, when the engine 8 is running and/or under oil pressure.

The sensors SN can be different depending on the nature of the first parameters to be measured. Another advantage is that by measuring first parameters PR1 representative of the quality of the lubricating oil OL taken from the main oil circuit C1, it is also possible to monitor the condition of the engine 8 and to detect abnormal conditions likely to affect the engine.

In this example, the sensors SN1 and SN2 are configured to measure at least the following first parameters PR1 of the oil OL:
  oil temperature T;
  oil pressure P;
  oil relative humidity HR;
  electrical conductivity CE of the oil; and
  dielectric constant CD of the oil.

As is well known, the electrical conductivity (measured in siemens per meter, noted S/m) characterizes the ability of the oil OL to let electrical charges move freely and allow an electrical current to pass through.

Other configurations are possible in which only a sub-combination of some of these parameters are measured by the sensor unit U1.

According to a particular embodiment, the first parameters PR1 measured by the sensors SN further include at least one parameter PT characterizing metallic particles that may be present in the oil OL. These may be ferrous and/or non-ferrous particles. In this case, the SN sensors measure as a PT parameter at least one of: the amount of metallic particles present in the oil OL, the size of the metallic particles present in the oil OL and the weight of the metallic particles present in the oil OL. However, other implementations are also possible in which the metal particles that may be present in the oil are not taken into account in the monitoring method of the invention.

These parameters T, P, HR, CE, CD, and possibly PT, have been selected in the present embodiment because of their inherent ability to characterize the operation of an engine so as to be able to detect and identify a wide spectrum of abnormal states (failures, damage, malfunctions, etc.) likely to affect this engine.

Furthermore, the outlet line 14 connected to the sensor unit U1 is set up to discharge oil OL from the sensor unit U1 into the main oil circuit C1. In this example, the oil OL taken from the tapping point 18 and measured by the sensors SN is discharged into the sump 10 to then return to the main oil circuit C1. The manner in which the outlet line 14 is configured may vary from case to case.

The lubricating oil OL can be circulated in a closed circuit in the engine system 2 which comprises the main circuit C1 and the secondary circuit C2.

As already mentioned, the monitoring system SY1 comprises the units U2, U3, U4 and U5 which are in this example housed in a housing 30 separate from the housing 20. This makes it possible to place the sensor unit U1 as close as possible to the main oil circuit C1 and to arrange the other components of the monitoring system SY1 remotely so that they are not exposed to the operating conditions of the main oil circuit C1 and to facilitate any interventions (installation, operations, adjustments, maintenance, etc.).

More particularly in this example, the housing 30 includes a processor 31, a non-volatile memory 32, the units U2-U5 and a user interface 23. The processor 31 driven by the computer program PG1 is configured here to implement the units U2, U3, U4 and U5, as shown in FIG. 1.

The housing 30 including in particular the processor 31 and the memory 32 takes the form of a computer or equivalent electronic device, for example.

The analysis unit U2 is configured to establish, based on the first parameters PR1 or from second parameters PR2 obtained by processing the first parameters PR1, whether at least one predefined condition CN is met. In this example, the first parameters PR1 are received here in the form of signals SG1 sent by the sensor unit U1 via the communication link L1. During its analysis, the analysis unit U2 compares the first or second parameters PR1, PR2 with at least one predefined threshold value SL according to at least one rule RL (as explained later).

The memory 32 is a rewritable non-volatile memory (Flash, EEPRO, etc.) or a read-only memory (ROM), this memory is a recording system (or data carrier) in accordance with a particular embodiment, readable by the monitoring system SY1, and on which a computer program PG1 according to a particular embodiment is recorded. This computer program PG1 includes instructions to execute certain steps of a monitoring method according to a particular embodiment. The steps of this method are described later in particular embodiments.

As shown in FIG. 1, the memory 32 is adapted to store at least one rule RL specifying at least one event EVT associated with at least one condition CN. In this embodiment, each event EVT corresponds to a particular deterioration of the quality of the oil OL detectable by the invention's monitoring system SY1. As will be explained later, the quality of the lubricating oil OL is likely to have deteriorated or altered in various ways, depending on the type of malfunction encountered by the engine 8.

It is assumed in this example that the memory 32 includes several rules RL each specifying at least one condition RL that must be met for an associated EVT event to be detected. Each rule RL may further specify at least one security action AT triggered by the control unit U4 in response to the event EVT's detection.

An event EVT in the sense of the invention constitutes any abnormal state of the lubricating oil OL detected by the monitoring system SY1, this abnormal state of the oil is itself representative (or symptomatic) of an abnormal state of the engine 8. In other words, an EVT event is a deterioration of the quality of the oil OL which is characterized by a particular change of one or more of the parameters PR1, and possibly PR2, and which is therefore detectable by the monitoring system SY1 from these parameters. An event EVT can be (or include) one or more predefined pollutions affecting the oil OL (e.g., water, fuel and/or metallic particle pollution), an abnormal state of its viscosity and more generally any abnormal state of the oil detectable from the first or second parameters PR1, PR2. These events EVT are defined beforehand by the skilled person on a case-by-case basis, depending in particular on the characteristics of the engine and the oil circuit and on the operating conditions.

Each event EVT, i.e., each type of deterioration of the quality of the oil OL, reflects an abnormal state of the engine 8 which requires particular attention. An event EVT may be representative of engine 8 damage or breakdown, deviation or deterioration from an engine baseline condition, or some other malfunction. Each abnormal state of the engine 8 emerges as a predefined deterioration or condition (pollution, deterioration, etc.) of the lubricating oil OL that the monitoring system SY1 is able to detect.

The memory 32 may further be configured to store the first parameters PR1, and possibly also the second parameters PR2, obtained over time for a predefined period of time (e.g., for 1 year) so that a user can access them later. In combination with these first and second parameters, the memory 32 can also store each event EVT detected during this period as well as the possible AT actions triggered in response to these events during this predefined duration. Access to this data may be useful for diagnostic, monitoring, operating statistics, maintenance or other purposes.

The control unit U4 is set up to trigger at least one predefined action AT in accordance with the rules RL, so as to secure the engine 8 should it detect at least one predefined event EVT. In particular, the control unit U4 can perform at least any one of the following actions AT:

sending or presenting an alarm notification representative of at least one event EVT detected by the monitoring system SY1 according to the rules RL; and initiating a command CMD1 from command unit U5 to change at least one engine 8 operating parameter.

The different types of possible commands will be described thereafter. For example, the control unit U4 can be configured to send a command CMD1 to command the engine 8 to go into a particular state (e.g., to initiate engine 8 shutdown or to change its operating speed or any operating parameters).

In the example shown in FIG. 1, the control unit U4 is set up to cooperate with the command unit U5 to control the state of the engine 8. The control unit U10 is, for example, configured, in response to a command CMD1 received from the control unit U4, to command the engine 8 to enter a particular state by sending it an appropriate command CMD2.

Furthermore, as shown in this example in FIG. 1, the user interface (or man-machine interface) 23 of the housing 30 includes a display screen 24 and buttons or other actuators noted 26. The number, nature and configuration of these components of the user interface 23 may vary as needed. Alternatively, or in addition, other means (audio, visual, etc.) may be used to interact with the user. The user interface 23 allows a user to get information provided by the monitoring system SY1 and, if necessary, to act to secure the engine 8 in the event of an abnormal state, for example.

The display screen 24 can be used here to display notifications NF to inform the user of detected EVT events. The term "notification" is understood here in a broad sense to mean any message or information that can be displayed on the screen 24 (or otherwise sent to the user). The screen can display warning messages NF or alert messages (alarms) NF, as well as any useful information for the user such as recommendations provided to the user to best handle the detected event EVT. In the example shown in FIG. 1, the display screen 24 is configured to display at least one gage 36 (2 gages in this example) to represent in real time at least one of the first or second parameters PR1, PR2 or any other parameters obtained from them.

If an event EVT is detected, such as engine damage or any other malfunction, the user can use the buttons (or actuators) 26 in order to force at least one command CMD1 to be sent by the control unit U4.

Furthermore, as explained later, calibration may be needed for the initial configuration of the monitoring system SY1 and more particularly of the analysis unit U2. The calibration unit U5 is configured to perform a calibration when it is required, as described later.

The configuration and operation of the units U1-U5 and U10 will appear in more detail in the following example embodiments. It is understood that these units as shown in FIG. 1 constitute only a non-limiting example of implementation of the invention. Certain elements generally present in particular in an oil circuit or in an engine system have been intentionally omitted because they are not required in order to understand this invention. Furthermore, certain elements of the engine system 2 are described here only to facilitate understanding of the invention, as these elements are not necessary to implement the invention, as understood by the person skilled in the art.

A particular embodiment is now described with reference to FIGS. 2-6. It is assumed that the engine 8 is running and/or under oil pressure and that the monitoring system SY1 previously described with reference to FIG. 1 implements a monitoring process (also referred to as a management process or control process). For this purpose, the sensor unit U1 measures first parameters PR1 and the processor 31 executes the computer program PG1 to put units U2-U5 into effect.

More specifically, in a preliminary step S2 (FIG. 2), the monitoring system SY1, and in particular the analysis unit U2, may receive initial configuration. It is initially assumed that the monitoring system SY1 is already operational so that no initial configuration S2 is required.

In step S8, the measuring unit U1 measures first parameters PR1 representative of the quality of an engine lubricating oil OL taken from the main oil circuit C1 via the inlet line 12 at tapping point 18. For this purpose, the inlet line 12 takes a portion of the oil flow OL flowing in the main oil circuit C1 so as to lead it from the connector 16 to the sensor unit U1 located in the housing 20. The sensors SN measure the first parameters PR1 while the sampled oil flows through the secondary oil circuit C2.

It is considered in this example that the first parameters PR1 measured by the sensors SN include:
- oil temperature T;
- oil pressure P;
- oil relative humidity HR;
- electrical conductivity CE of the oil; and
- dielectric constant CD of the oil.

The sensors SN can regularly, or even continuously, measure the first parameters PR1 from the oil OL taken from the main oil circuit C1. As already indicated, the first parameters PR1 measured by the sensors SN may also include at least one parameter PT characterizing metallic particles that may be present in the oil OL. These may be ferrous and/or non-ferrous particles. In this case, the SN sensors measure as a parameter PT at least one of: the amount of metallic particles present in the oil OL, the size of the metallic particles present in the oil OL and the weight of the metallic particles present in the oil OL. The characterization of the metal particles in the oil OL provides a more complete and accurate assessment of the condition of the engine 8. However, consideration of these particles is not a requirement to implement the invention.

The sensor unit U1 generates signals SG1 including the first parameters PR1 measured (S8) by the sensors SN. These signals SG1 are sent via the communication link L1 to the device 30.

Figure 3:
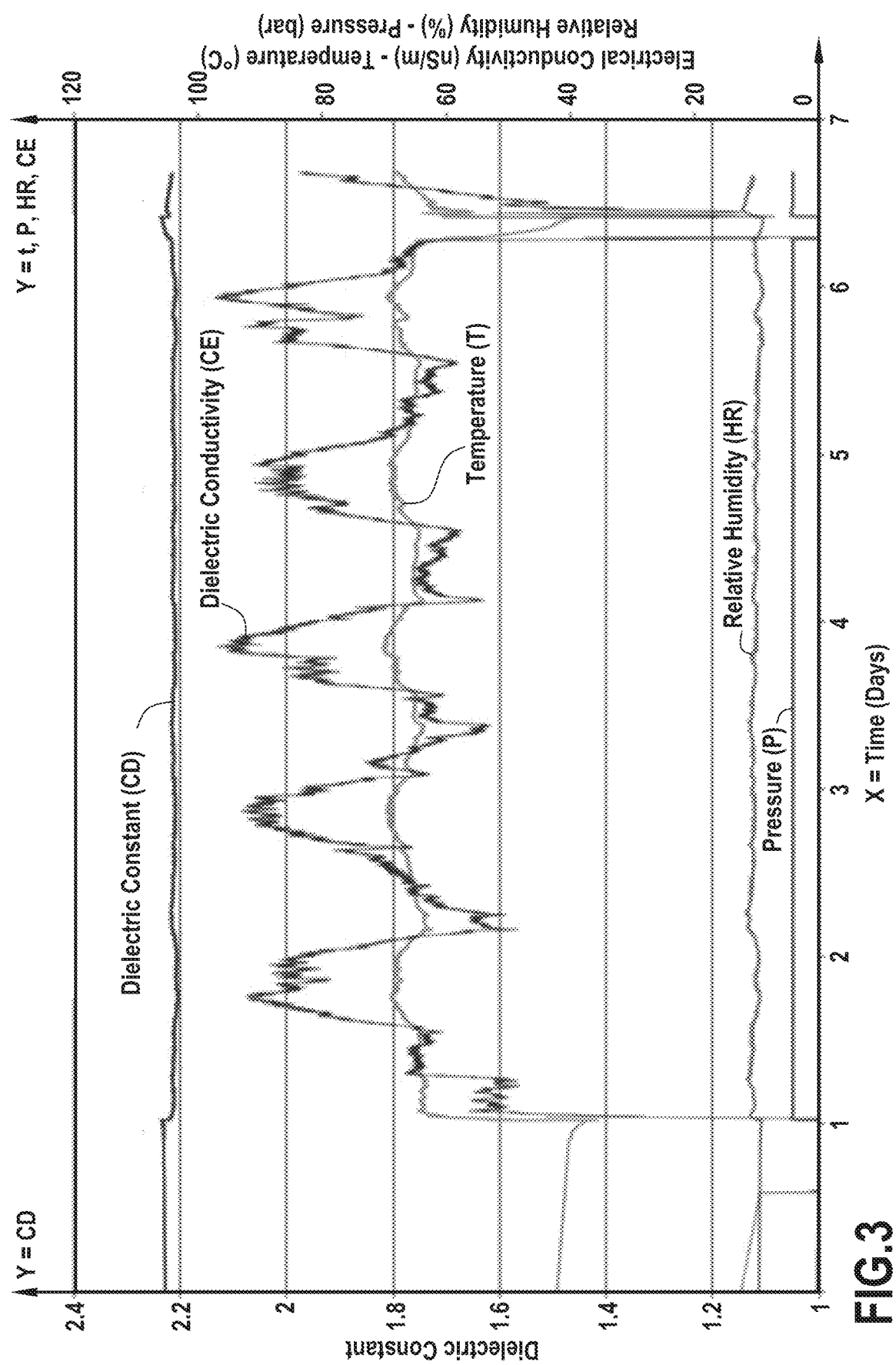
FIG. 3 schematically represents the evolution of first parameters measured by a monitoring system, according to a particular embodiment of the invention.

FIG. 3 is a graphic representation of the evolution of the following first parameters PR1 over time: temperature T, pressure P, relative humidity HR, electrical conductivity CE and dielectric constant CD measured by the sensors SN.

Figure 4:
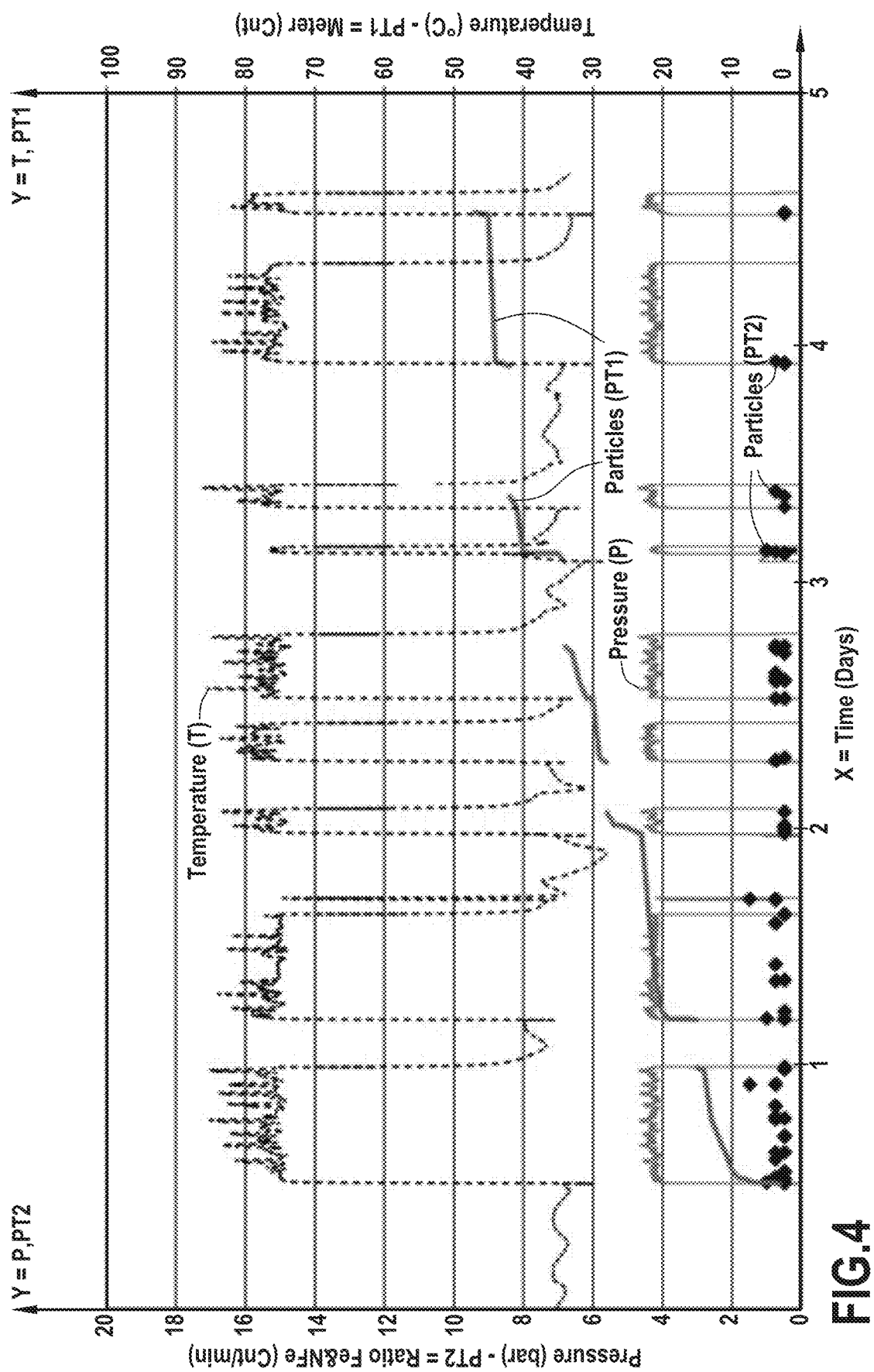
FIG. 4 schematically represents the evolution of parameters processed by a monitoring system, according to a particular embodiment of the invention.

FIG. 4 is a graphic representation of the evolution, as first parameters PR1, of the temperature T, the pressure P and two parameters PT1 and PT2 characterizing metallic particles found in the oil OL. In this example, these parameters PT1 and PT2 define the quantity of metallic particles (ferrous particles Fe and non-ferrous particles NFe) found in the oil OL in two different ways (PT1: cumulative count of the metallic particles; PT2: point count per minute of the metallic particles).

During an analysis step S10 (FIG. 2), the analysis unit U2 performs an analysis based on the first parameters PR1 received from the sensor unit U1 to determine whether at least one predefined condition CN as defined in the rules RL is met. During this analysis S10, the analysis unit U2 namely uses the first parameters PR1 or second parameters PR2 obtained by a processing S12 of the first parameters PR1 to establish whether at least one predefined condition CN is met, by comparing these first or second parameters with at least one threshold value SL.

According to a first example, no processing S12 is performed at this stage, the analysis unit U2 then establishes (S14, FIG. 2) whether at least one predefined condition CN is met from the first parameters PR1. The analysis unit U2 can compare each of the first parameters PR1 (or only part of them) with respective thresholds SL defined in the rules RL. To be met, a condition CN requires, for example, that a respective first parameter PR1 reaches a predefined threshold (minimum or maximum) SL.

A second example is considered here, according to which processing S12 (FIG. 2) is performed by the analysis unit U2 during the analysis S10 to determine second parameters PR2 based on the first parameters PR1 measured in S8, and then to determine from these second parameters PR2 whether at least one predefined condition CN is met.

More precisely, during this processing S12, the analysis unit U2 processes S12 the electrical conductivity CE and the dielectric constant CD of the oil received from the sensor unit U1. The purpose of this processing is to obtain a corrected electrical conductivity CEc and a corrected dielectric constant CDc from the electrical conductivity CE and the dielectric constant CD measured in S8, respectively.

As shown in FIG. 3, it was found that the electrical conductivity CE and the dielectric constant CD of the oil vary significantly depending on the weather conditions, and more precisely as a function of the temperature T, the pressure P and the relative humidity HR of the oil OL flowing in the main oil circuit C1. Among other things, it has been noted that the electrical conductivity CE increases significantly as the temperature T increases. Temperature and/or other changes affecting the engine 8 and more generally the main oil circuit C1 may therefore make the measurements of the electrical conductivity CE and the dielectric constant CD of the oil unstable or more difficult to analyze when assessing engine 8's operating condition at iso conditions.

In the embodiment envisaged here, the analysis unit U2 performs the two operations S12a and S12b described below during processing S12. These two operations S12a and S12b can be performed simultaneously or one after the other in any order. In a particular example, only one of these two operations S12a and S12b is performed, so that only one of the corrected electrical conductivity CEc and the corrected dielectric constant CDc is established and taken into account as a second parameter PR2 used by the invention to detect at least one event EVT.

More specifically, the analysis unit U11 determines (S12a), as a second parameter PR2, a corrected electrical conductivity CEc from the electrical conductivity CE measured in S8 by applying a first polynomial function f3CE, referred to as the first final polynomial function. This first final polynomial function f3CE defines the corrected electrical conductivity CEc from the electrical conductivity CE, the temperature T, the pressure P and the relative humidity HR measured by the sensors SN in S8.

The range of the polynomial function f3CE is n. In this example, n=6 (although other ranges are possible, as n is an even integer) and the polynomial function f3CE is stated as follows:

$$CEc=[(a6 \cdot T^6+a5 \cdot T^5+a4 \cdot T^4+a3 \cdot T^3+a2 \cdot T^2+a1 \cdot T+a0)+ \\ (b6 \cdot P^6+b5 \cdot P^5+b4 \cdot P^4+b3 \cdot P^3+b2 \cdot P^2+b1 \cdot P+b0)+ \\ (c6 \cdot HR^6+c5 \cdot HR5+c4 \cdot HR^4+c3 \cdot HR^3+c2 \cdot HR^2+ \\ c1 \cdot HR+c0)] \cdot CE$$

where CEc is the corrected electrical conductivity and CE is the measured electrical conductivity also called the raw electrical conductivity.

As indicated above, the first final polynomial function f3CE is weighted by first coefficients a0-a6, b0-b6 and c0-c6 (noted collectively CFCE) associated respectively with the temperature T, the pressure P and the relative humidity HR. These coefficients are defined in such a way as to compensate, at least in part, for the respective influence of the temperature T, the pressure P and the relative humidity HR on the electrical conductivity CE measured in S8 by the sensor unit U1.

Figure 5:
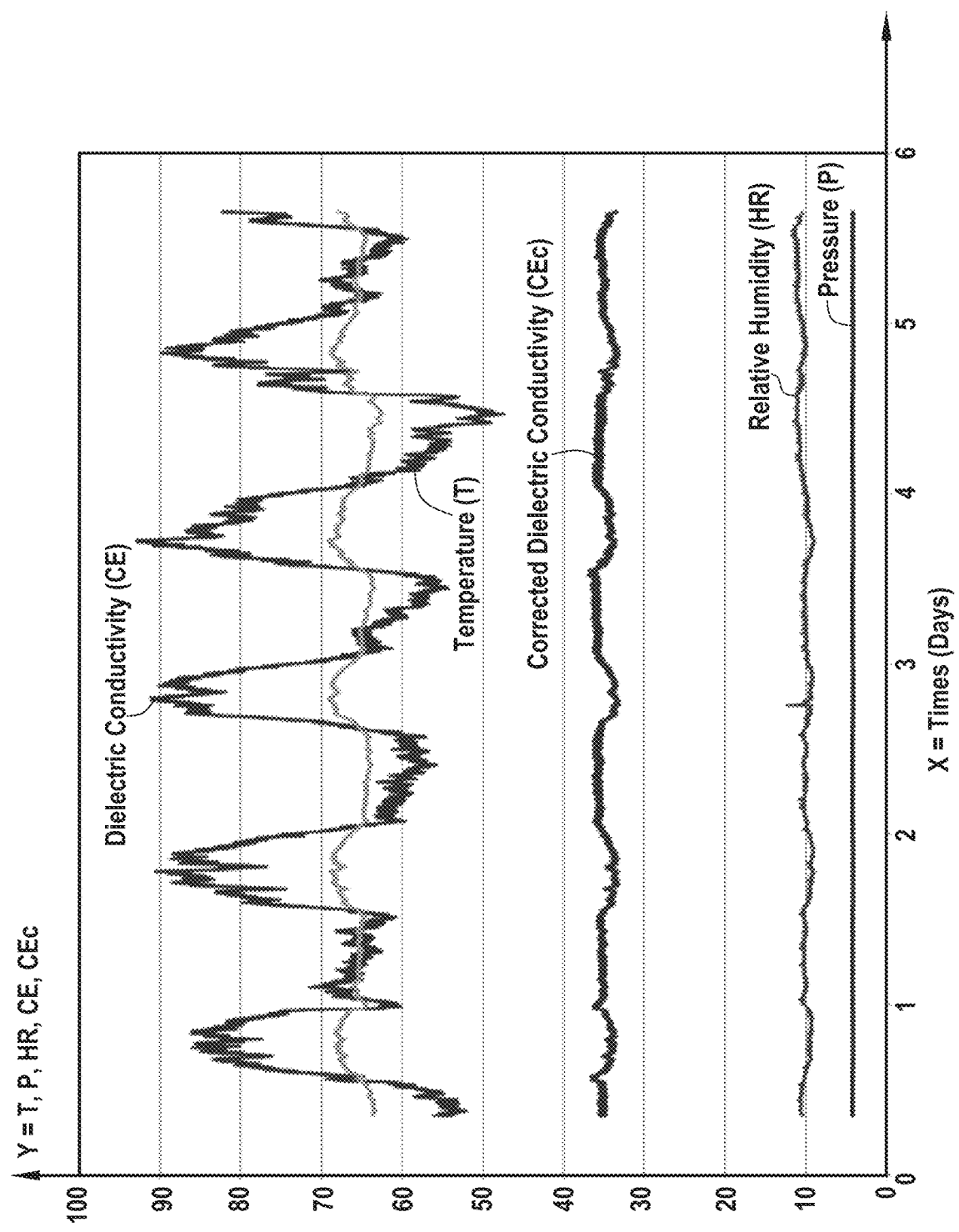
FIG. 5 schematically represents the evolution of parameters processed by a monitoring system, according to a particular embodiment of the invention.

The CFCE coefficients are hereafter noted as follows:
CFCE-T: the coefficients a0-a6;
CFCE-P: the coefficients b0-b6;
CFCE-HR: the coefficients c0-c6;

FIG. 5 is an example of the evolution of the corrected electrical conductivity CEc as a function of time, obtained from the processing S12a in a specific case.

Similarly, the analysis unit U11 determines (S12b), as a second parameter PR2, a corrected dielectric constant CDc from the dielectric constant CD measured in S8 by applying a second polynomial function f3CD, called the second final polynomial function. This second final polynomial function f3CE defines the corrected dielectric constant CDc from the dielectric constant CD, the temperature T, the pressure P and the relative humidity HR measured by the sensors SN in S8.

The range of the polynomial function f3CD is n. In this example, p=n=6 (although other ranges are possible, as p is an even integer) and the polynomial function f3CD is stated as follows:

$$CDc=[(d6 \cdot T^6+d5 \cdot T^5+d4 \cdot T^4+d3 \cdot T^3+d2 \cdot T^2+d1 \cdot T+d0)+ \\ (e6 \cdot P^6+e5 \cdot P^5+e4 \cdot P^4+e3 \cdot P^3+e2 \cdot P^2+e1 \cdot P+e0)+ \\ (f6 \cdot HR^6+f5 \cdot HR^5+f4 \cdot HR^4+f3 \cdot HR^3+f2 \cdot HR^2+f1 \cdot HR+ \\ f0)] \cdot CD$$

where CDc is the corrected dielectric constant and CD is the measured dielectric constant also called the raw dielectric constant.

As indicated above, the second final polynomial function f3CD is weighted by first coefficients d0-d6, e0-e6 and f0-f6 (noted collectively CFCD) associated respectively with the temperature T, the pressure P and the relative humidity HR, these coefficients being defined in such a way as to compensate at least in part for the respective influence of the temperature T, the pressure P and the relative humidity HR on the dielectric constant CE measured in S8 by the sensor unit U1.

The CFCD coefficients are hereafter noted as follows:
CFCD-T: the coefficients d0-d6;
CFCD-P: the coefficients e0-e6; and
CFCD-HR: the coefficients f0-f6.

The value of the coefficients CFCE and CFCD in the polynomial functions f3CE and f3CD can be adapted as appropriate so as to adequately compensate the influence of the variations of each of the parameters T, P and HR on CE and CD respectively. A way to establish these coefficients CFCE and CFCD is described later in a particular example. As will be explained later, the coefficients CFCE and CFCD can be chosen so that the respective correction applied to CE and CD is zero for a reference temperature Tref, a reference pressure Pref and a reference relative humidity HRref.

Figure 6:
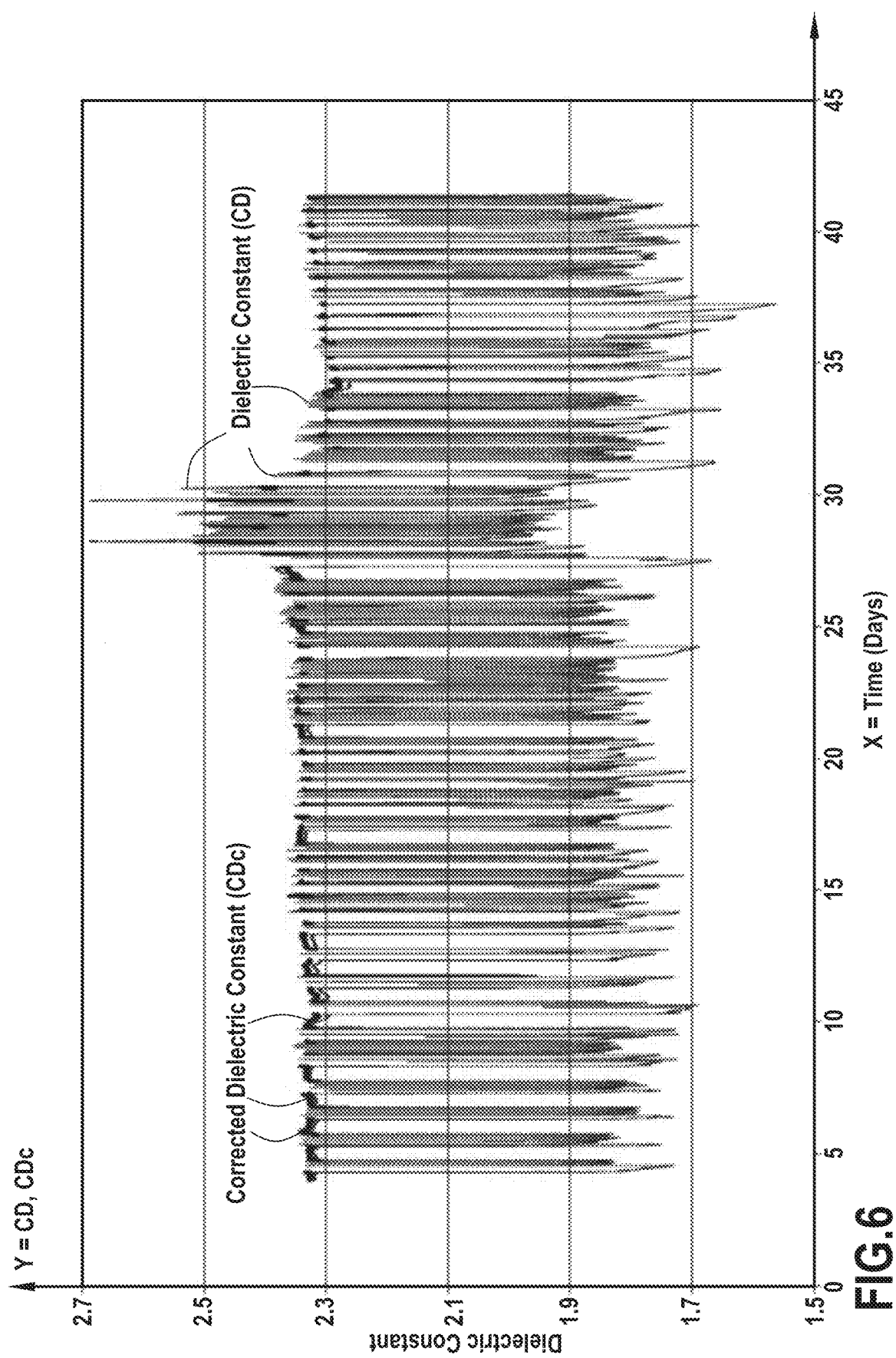
FIG. 6 schematically represents the evolution of parameters processed by a monitoring system, according to a particular embodiment of the invention.

FIG. 6 represents as an example the evolution of the corrected dielectric constant CDc as a function of time, obtained from the processing S12b in a specific case.

In this case, it is considered that the second parameters PR2 determined during processing S12 and taken into account by the monitoring system SY1 are: the corrected electrical conductivity CEc and the corrected dielectric constant CDc obtained in S12 as well as the relative humidity HR measured in S8. However, other examples are possible in which other processes S10 are performed and in which other parameters are used as second parameters PR2 of the invention. As will be shown later, at least one parameter PT characterizing metal particles that may be found in the oil OL may also be taken into account as a second parameter PR2 in alternative embodiments.

Also during the analysis S10, the analysis unit U2 further determines (S14, FIG. 2) whether at least one condition CN as defined by the rules RL is met. As already mentioned, each rule RL stored in the memory 32 defines one or more rules CN linked to a respective event EVT and possibly to at least one corresponding security action AT. Each EVT event corresponds to a deterioration or abnormal condition of the oil quality OL that may occur in response to a particular malfunction of the engine 8. Examples of rules RL are described later with reference to FIG. 10.

In the embodiment considered here, each condition CN defines a threshold SL (minimum or maximum) that a first parameter PR1 or second parameter PR2 must reach for the condition CN to be met. In the determination step S14, the analysis unit U2 compares the second parameters PR2 obtained in S12 (CEc, CDc and HR in this example) with associated thresholds SL (minimum or maximum), as defined in the rules RL, to establish whether one or more conditions CN are met.

Each CN condition can define a threshold SL (maximum or minimum) to be compared to the corrected electrical conductivity CEc, the corrected dielectric constant CDc or the relative humidity HR.

If the detection unit U3 does not detect (S14) that the condition(s) CN associated with an EVT event according to the rules RL are met, then the process resumes at step S8. Steps S8 and S10 can be repeated iteratively in order to be able to monitor the behavior of engine 8 over time.

In this case, it is considered that during a detection step S16, the detection unit U3 detects an EVT event (and deterioration of the oil quality OL) representative of an abnormal state of the engine 8 if at least one associated condition CN is met, according to the predefined rules RL. As already indicated, each EVT event corresponds to an abnormal state of the lubricating oil OL, i.e., to a deterioration of the quality of this oil with respect to a baseline state. By detecting the event EVT, it can be inferred that the engine 8 is experiencing an associated malfunction. To do this, the detection unit U3 therefore applies the rules RL to determine whether the CN condition(s) associated with an event EVT are met. If this is the case, the detection unit U3 detects a type of oil quality degradation as an event EVT, and therefore detects an abnormal condition encountered by the engine 8.

According to a particular example, upon detection (S16) of an event EVT, the control unit U4 may trigger (S18) at least one predefined action AT according to the rules RL so as to secure the engine 8 accordingly.

Upon detection of an event EVT, the control unit U4 may for example send or present a notification NF about the oil quality deterioration detected by the monitoring system SY1, and possibly also to signal the abnormal condition potentially encountered by the engine 8. It is then up to the users to take the appropriate measures to check this information and secure the engine 8 (and more generally the engine system 2) if necessary. This notification NF can be sent to a user by any appropriate communication means and/or presented in any appropriate form. In the example shown in FIG. 1, the notification NF is displayed on the screen 24 of the user interface 23.

According to a specific example, once an event EVT has been detected, the control unit U4 uses command unit U5 to initiate a CMD2 command to change at least one operating setting of the engine 8 (or of another component of the main oil circuit C1) in order to make it safe or at least to optimize its operation. To do this, the control unit U4 sends at least one command CMD1 to the control unit U10. This control unit U10, external to the device 30, acts as an interface between the control unit U4 and engine 8.

According to a specific example, the control unit U4 commands (S18) the automatic shutdown of the engine 8 in response to a deterioration of the oil quality OL detected in S16.

In the embodiment described above, the monitoring system SY1 performs a processing S12 during the analysis S10 to obtain second parameters PR2, namely CEc, CDc and HR, from the first parameters (T, P, HR, CE, CD) measured on the oil OL in S8. In this particular case, the relative humidity HR is used as the second parameter PR2 without any special processing.

Alternatively, the monitoring system SY1 can directly compare the first parameters PR1 to associated thresholds SL (minimum or maximum) as defined in the rules RL. In this case, processing S12 is not required to obtain second parameters PR1 from the first parameters PR1.

The use of the corrected electrical conductivity CEc and the corrected dielectric constant CDc is, however, useful in that it improves the accuracy and reliability of the monitoring system SY1 since its results are less affected by possible changes in weather conditions to which the engine system 2 is exposed, therefore comparing the results to iso-condition.

Steps S8 and S10 can be performed iteratively as long as an event EVT has not been detected (and possibly continue afterwards), in order to continuously monitor the condition of engine 8.

Furthermore, we note that in the example described above with reference to FIG. 1, the tapping point 18 where the connector 18 connects to the main oil circuit C1 is located between the pump 4 and the engine 8. By placing the tapping point 18 upstream of the filter 6 in the oil circuit C1 (with respect to the oil flow OL), the monitoring system SY1 is able to effectively control the quality of the oil OL insofar as the measurements are performed on the oil OL before it is filtered in the oil filter 6, which makes it possible to detect any pollution, sludge, soot, degradation, etc., in the oil OL and in the engine 8. The oil filter 6 is likely to at least partially mask the state of pollution of the oil OL caused by possible malfunctions of the engine 8.

According to a particular embodiment, the tapping point 18 at which the connector 18 of the inlet pipe 12 is connected to the oil circuit C1 is located:
  between the pump 4 and the oil filter 6 so as to be downstream of the pump 4 and upstream of the engine 8 (as shown for example in FIG. 1); or
  between the pump 4 and the engine 8 so as to be downstream of the engine 8 and upstream of the pump 4.

Alternatively, the pump can be positioned at the engine 8 outlet. In this case, it is possible to position the tapping point 18 between engine 8 and housing 10 (downstream of engine 8 and upstream of housing 10).

The invention makes it possible to monitor the condition of a mechanical engine during operation on the basis of the quality of the oil circulating in the engine oil circuit. By measuring parameters representative of the quality of the oil, the system of the invention is able to detect possible deterioration and/or pollution of the quality of the oil, which would indicate an abnormal condition of the engine. This monitoring can be carried out continuously, or periodically or regularly, so as to monitor the operational state of the engine while it is running.

The invention makes it possible to detect at an early stage (or even in real time) any malfunctions, anomalies, damage, operating deviations or other problems that an engine may encounter during its life cycle.

In particular, the invention makes it possible to check whether an engine is in operational condition or whether its performance has deteriorated due to any malfunction. Thanks to the invention, it is possible to easily, quickly and reliably monitor an engine, allowing for efficient maintenance of the engine if needed.

The invention also makes it possible, if necessary, to warn the user of a problem encountered by the engine and to possibly initiate predefined actions to automatically secure the engine or modify its settings.

The invention is also capable of operating without disrupting the proper functioning of the engine and more generally the oil circuit. The bypass configuration of the monitoring system SY1 (and more precisely of the sensor unit U1) makes it possible, if necessary, to shut off the sensors without disrupting the main oil circuit of the engine.

The choice of the first parameters PR1, and possibly the second parameters PR2, which are taken into account by the monitoring system SY1 during the analysis S10 (FIG. 2) is left to the discretion of the person skilled in the art, as this choice may vary according to the use case. These parameters are chosen and analyzed to allow one or more predefined states of the engine (malfunction or other) to be detected.

As previously indicated, the sensors SN can be set up to measure, among the first parameters PR1, at least one parameter PT characterizing metallic particles (ferrous and/or non-ferrous) likely to be present in the oil OL. The first parameters PR1 may include at least one of the following as a PT parameter: the amount of metallic particles present in the oil OL, the size of metallic particles present in the oil OL and the weight of metallic particles present in the oil OL. Each of these parameters PT can be compared during the analysis S10 (FIG. 2) with one or more associated thresholds SL as defined in the CN conditions to determine if an event EVT is detected under the rules RL.

Taking into account the metal particles to evaluate the quality of the oil OL circulating in the main oil circuit C1 makes it possible to improve the monitoring process of the invention. Some abnormal states of the engine 8 can be detected based on, among other things, the characterization of the metal particles likely to pollute the oil OL.

In general, the display screen 36 (FIG. 2) can be configured to display in real time, in the form of gages, for example, at least one parameter representing the quality of the oil measured by the monitoring system SY1. The display may relate to one or more first parameters PR1 and second parameters PR2, or alternatively or additionally, to at least one third parameter representing the state of the oil OL synthetically.

Moreover, as already indicated, the type of treatment carried out in S12 (FIG. 2) can vary depending on the case. In other words, the nature of the second parameters PR2 calculated and taken into account can be adapted if needed.

According to a particular embodiment shown in FIGS. 7-10, the monitoring system SY1 takes into account, as a second parameter PR2, the deviations of the corrected electrical conductivity CEc and the corrected dielectric constant CDc from respective reference values corresponding to a reference state of the main oil circuit C1.

Figure 2:
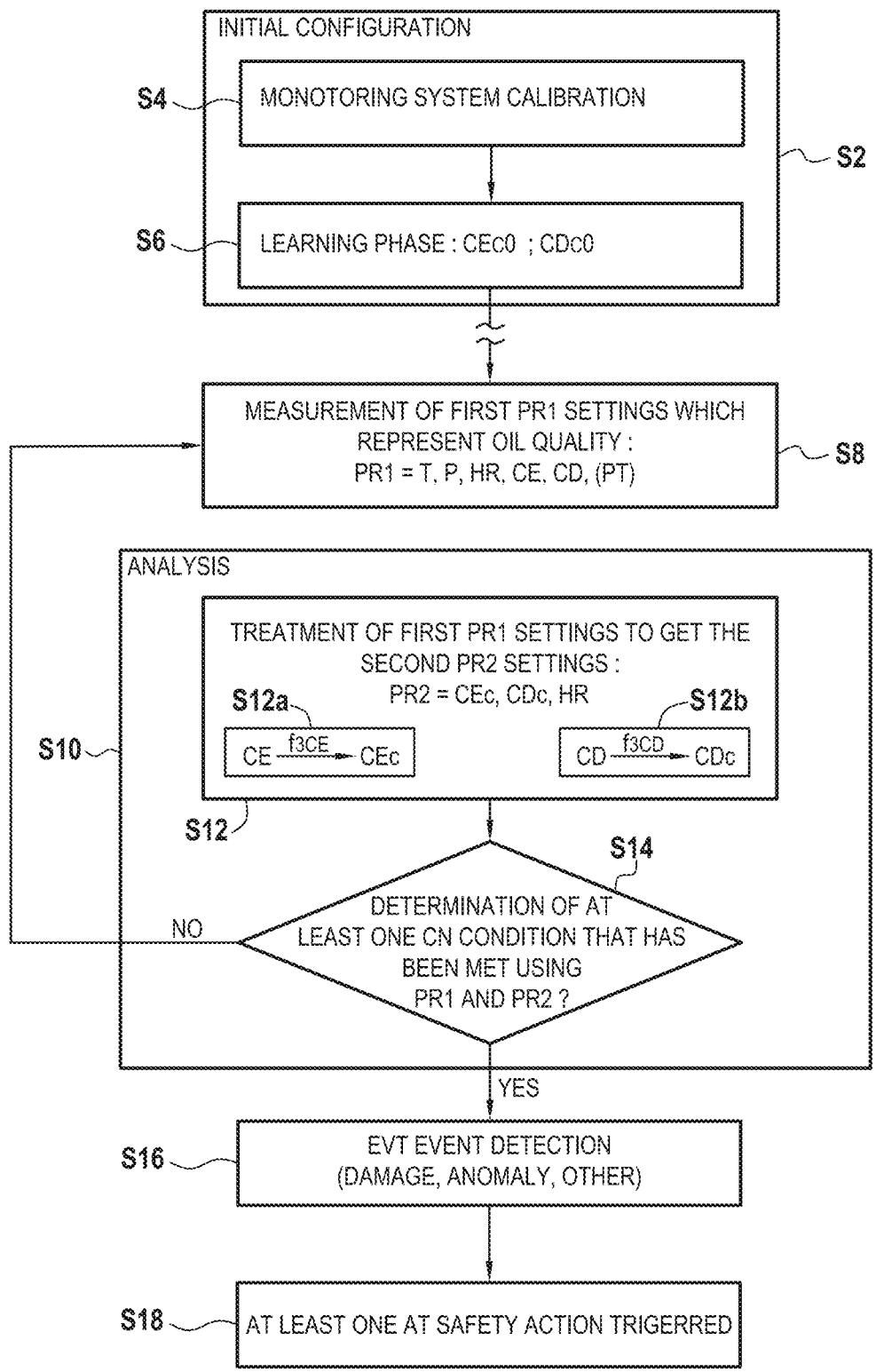
FIG. 2 schematically represents, in the form of a diagram, the steps of a process according to a particular embodiment of the invention.
Figure 7:
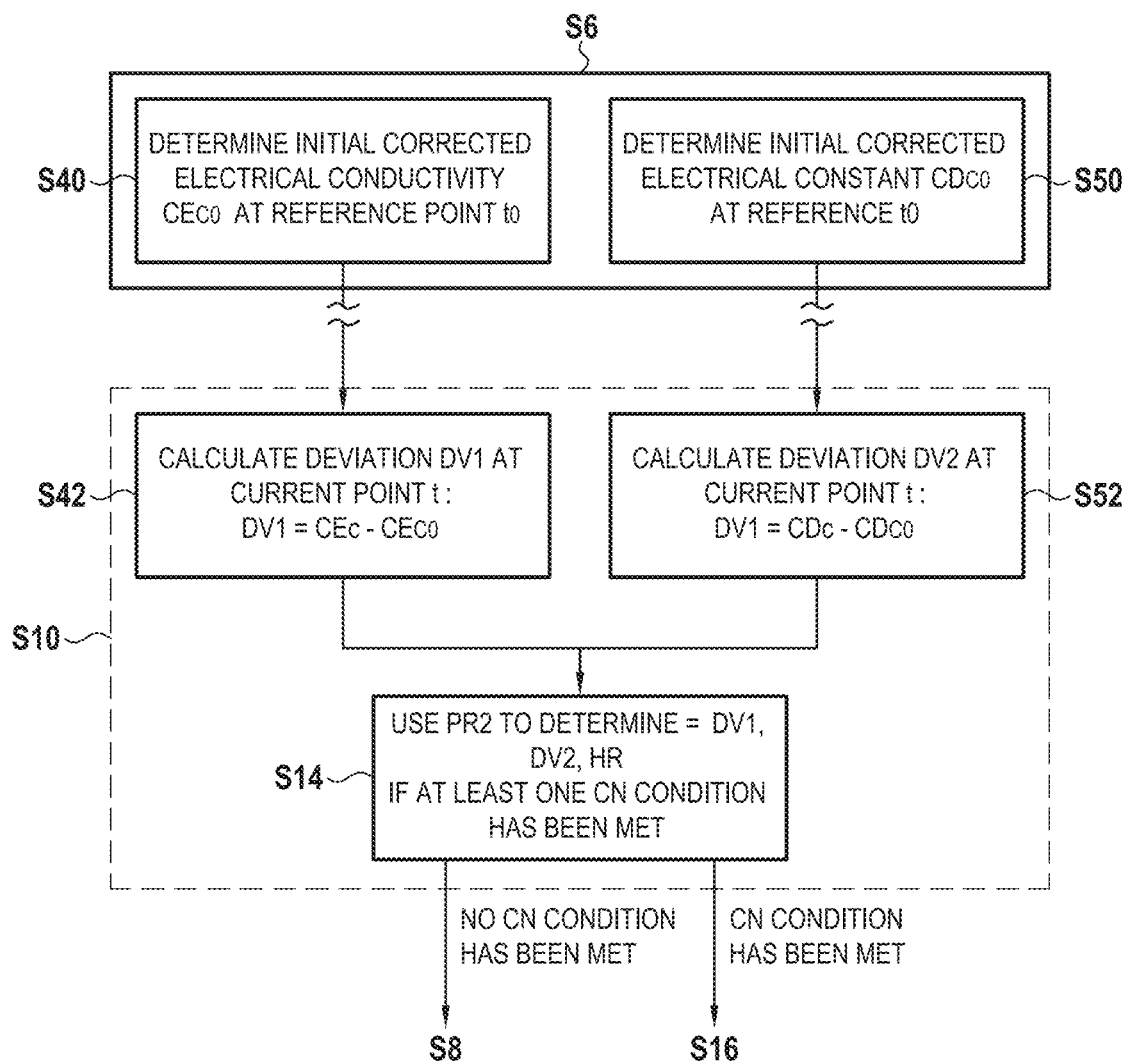
FIG. 7 schematically represents, in the form of a diagram, the steps of a process according to a particular embodiment of the invention.

More specifically, during a learning phase (or step) S6 shown in FIG. 2, the analysis unit U2 establishes the corrected electrical conductivity CEc0, so-called initial corrected electrical conductivity, of the oil OL at a reference time t0 (S40, FIG. 7). To do this, the analysis unit U2 determines the electrical conductivity CE measured at this initial instant t0 by the sensor unit U1, and then calculates the initial corrected electrical conductivity CEc0 based on the electrical conductivity CE measured at t0 by applying the first final polynomial function f3CE, similarly to step S12a described above. According to a specific example, the reference time t0 may correspond to a reference period (of several hours, for example) during which the electrical conductivity CE is averaged to obtain the electrical conductivity CE measured at that time t0.

During this learning phase S6 shown in FIG. 2, the analysis unit U2 also determines the corrected dielectric constant CED0, the so-called initial corrected dielectric constant, of the oil OL at the reference time t0 (S50, FIG. 7). To do so, the analysis unit U2 determines the dielectric constant CD measured at this initial instant t0 by the sensor unit U1, and then calculates the initial corrected dielectric constant CDc0 based on the dielectric constant CD measured at t0 by applying the second final polynomial function f3CD, similarly to step S12b described above. According to a specific example, similarly to what is described above for CEc0, the reference time t0 may correspond to a reference period (of several hours, for example) during which the dielectric constant CD is averaged to obtain the dielectric constant CD measured at that time t0.

Steps S40 and S50 may be performed simultaneously or in any order.

The reference time t0 corresponds to a time when engine 8 is in a reference state (or initial state), for example when the engine is commissioned (for example when it is commissioned for the very first time [new engine] or when it is recommissioned following an oil change).

Subsequently, during the processing step S12, the analysis unit U2 performs the following steps S42 and S52 (FIGS. 2 and 7). More specifically, during a calculation step S42, the analysis unit U2 establishes a first deviation DEV1 between a corrected electrical conductivity CEc obtained in S12a at a current time t (later than t0) and the initial corrected electrical conductivity CEc0 obtained in S40. In other words:

$$DEV1=(CEc-CEc0)/CEc0 \quad \text{[Math. 3]}$$

Similarly, in a calculation step S52, the analysis unit U2 establishes a second deviation DEV2 between a corrected dielectric constant CDc obtained in S12b at a current time t (later than t0) and the initial corrected dielectric constant CDc0 obtained in S40. In other words:

$$DEV2=(CDc-CDc0)/CDc0 \quad \text{[Math. 4]}$$

The analysis unit U2 then performs the determination step S14 (FIG. 7) in a manner similar to what was previously described with reference to FIG. 2. In this specific example, the analysis unit U2 uses (S14) as second parameters PR2 the previously obtained deviations DEV1 and DEV2 as well as the relative humidity HR measured in S8 to determine, based on the rules RL, whether at least one condition CN is met. To do this, the analysis unit U2 therefore compares these second parameters PR2 with respective thresholds SL (minimum or maximum) defined in the conditions CN of the rules RL.

If the condition(s) CN associated with the same particular EVT event are met, then the process continues by detecting (S16) said EVT event and triggering (S18) at least one securing action AT, as already described previously with reference to FIG. 2. Otherwise, the process continues by repeating steps S8 and S10, as already explained.

Figure 8:
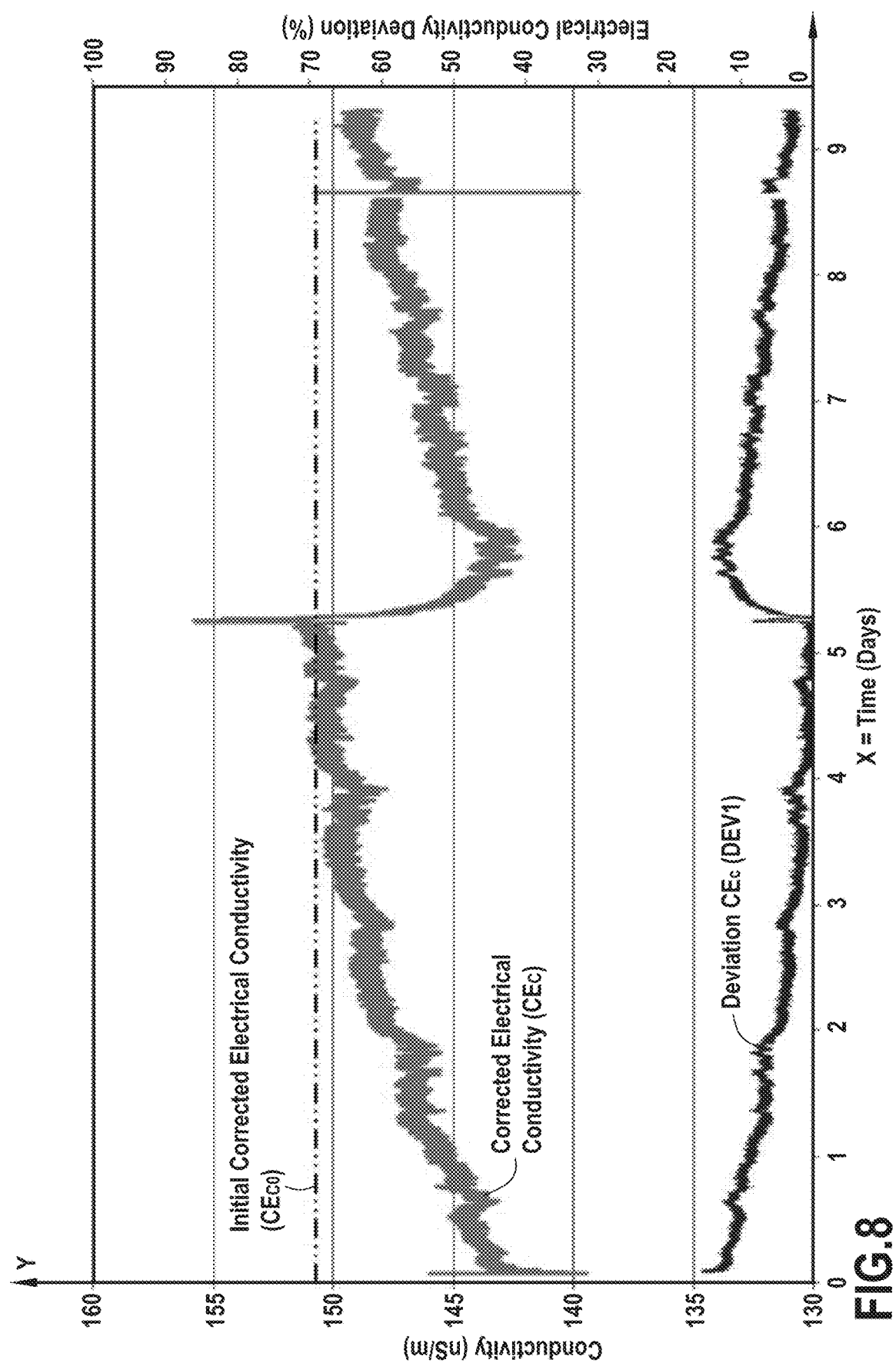
FIG. 8 schematically represents the evolution of parameters processed by a monitoring system, according to a particular embodiment of the invention.

As an example, FIG. 8 represents a specific example of the initial corrected electrical conductivity CEc0 as well as the evolution over time of the corrected electrical conductivity CEc and of the first deviation DEV1 representing the difference between CEc and CEc0.

Figure 9:
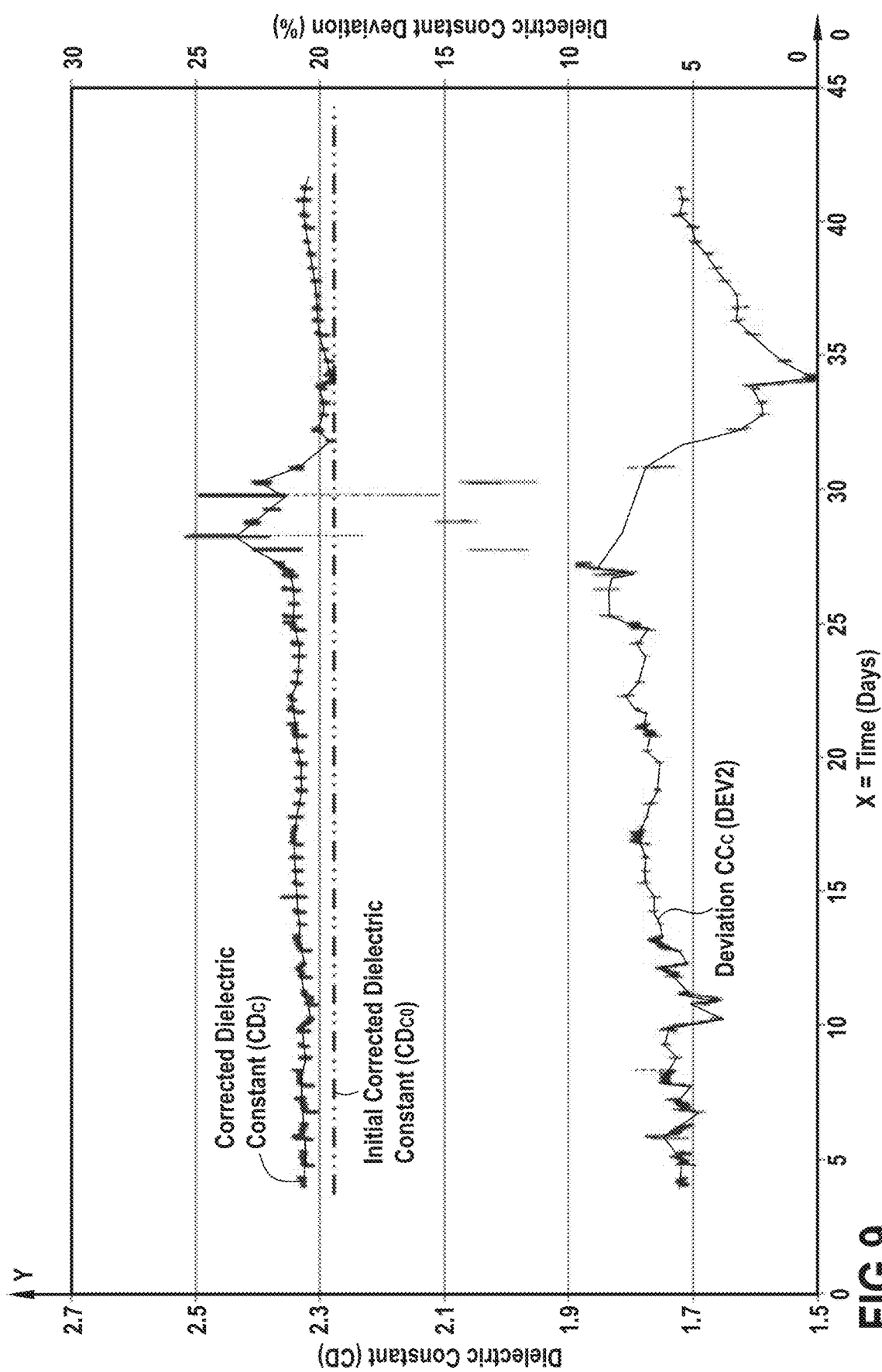
FIG. 9 schematically represents the evolution of parameters processed by a monitoring system, according to a particular embodiment of the invention.

As an example, FIG. 9 represents a specific example of the initial corrected dielectric constant CDc0 as well as the evolution over time of the corrected dielectric constant CDc and of the second deviation DEV2 representing the difference between CDc and CDc0.

By taking into account the deviations of the initial corrected conductivity CEc0 and the initial corrected dielectric constant CDc0 from a reference state as second parameters PR2, the invention's monitoring system SY1 is able to effectively and reliably detect progressive degradations over time that are likely to affect the quality of the oil OL following a malfunction or an abnormal state of the engine 8.

According to a specific example, only one of the deviations DEV1 and DEV2 is calculated and taken into account during the invention method's analysis S10.

Moreover, as already stated, the content of the rules RL, and in particular the nature and number of applicable conditions CN as well as the type of associated events EVT, can be adapted on a case-by-case basis. Different combinations of conditions CN and detected events EVT can be predefined and represented in a diagnostic table.

For example, the rules RL can provide that at least one event EVT is detected if only one of the deviations DEV1 and DEV2 reaches a threshold SL (minimum or maximum), or alternatively, if the two deviations DEV1 and DEV2 each reach a respective threshold SL (minimum or maximum), possibly also taking into account the relative humidity HR with respect to a respective threshold (minimum or maximum).

There may be a need to perform analyses and tests of the monitoring system SY1 implemented in the engine system 2 to define, in each case, a diagnostic matrix adequately defining the conditions CN to be satisfied in order to detect an associated event EVT, from one or more thresholds SL applied to some parameters PR1 and/or PR2.

Figure 10:
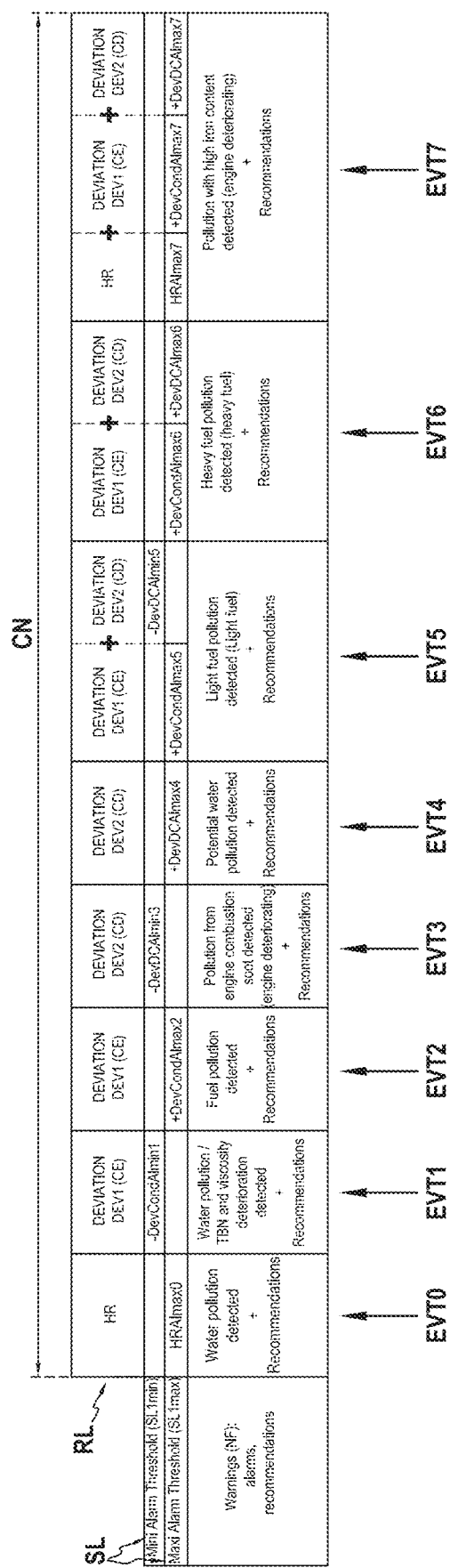
FIG. 10 shows schematically, in the form of a table, rules implemented by a monitoring system, according to a particular mode of implementation of the invention.

FIG. 10 shows the rules RL in the form of a diagnostic table, according to a particular example. According to this example, the deviations DEV1, DEV2 and the relative humidity HR are taken into account as second parameters PR2 in the monitoring process of the invention to determine whether or not an event EVT under the rules RL is detected in S16. The rules RL define seven (7) distinct events EVT0-EVT7 which are each associated with 1, 2 or 3 respective conditions CN which must be met for the associated event EVT to be detected.

Figure 11:
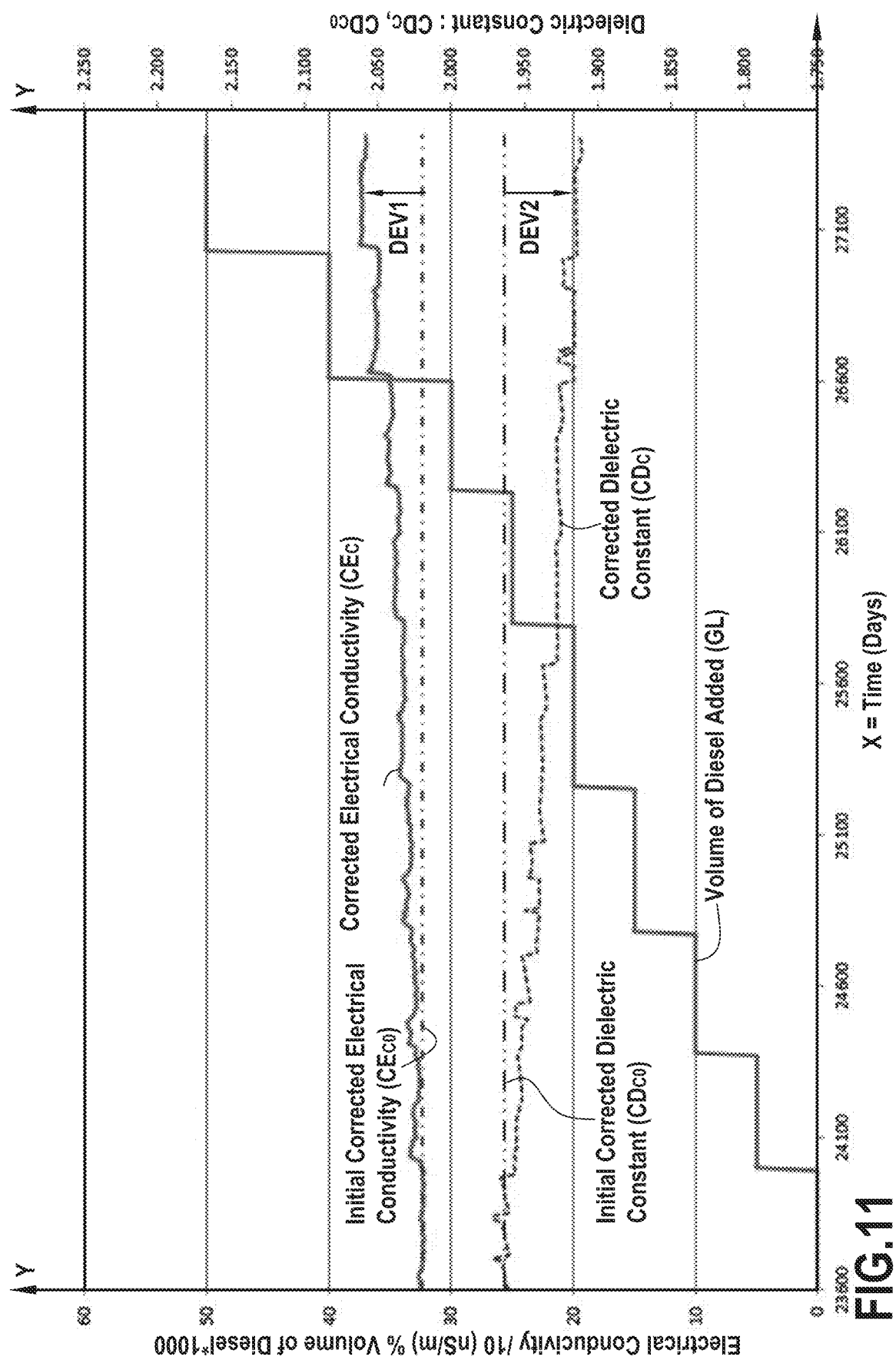
FIG. 11 schematically represents the evolution of parameters processed by a monitoring system, according to a particular embodiment of the invention.

For example, FIG. 11 represents a specific case where a light fuel pollution in the oil OL is detected as event EVT5. In this document, a light fuel refers to a fuel characterized in that its viscosity at a temperature of 40° C. is less than or equal to 100 centistokes (cSt) corresponding to $10^{-4}$ m²/s, which means that a light fuel is in a liquid state at ambient temperature and pressure. In contrast to light fuel, a fuel is considered "heavy" if it must be maintained at a minimum temperature of 70° C. to remain in a liquid state (below a temperature of 40° C., a heavy fuel becomes pasty and unusable in the engine).

According to the rules RL shown in FIG. 10, the event EVT5 is detected if the following CN conditions are met:
the first deviation DEV1 of the corrected electrical conductivity CEc with respect to the initial corrected electrical conductivity CEc0 is greater than or equal to a maximum threshold noted +DevCondAlmax5; and
the second deviation DEV2 of the corrected dielectric constant CDc from the initial corrected dielectric constant CDc0 is less than or equal to a minimum threshold noted −DevDcAlmin5.

According to a particular example, +DevCondAlmax5 is equal to 4.5 and −DevDcAlmin5 is equal to 2. According to another example, +DevCondAlmax5 is equal to 12 and −DevDcAlmin5 is equal to −3.

As shown in FIG. 11, it is assumed for example that diesel pollution occurs in the lubricating oil OL circulating in the main oil circuit C1. This contamination is the result of an engine malfunction, such as a fault in the engine seals, cylinder heads, liners, segmentation, injectors, injection pumps, etc. The addition of diesel to the oil OL is shown in this example by an increase in the first deviation DEV1 and a decrease in the second deviation DEV2, over time.

Once it has been detected that DEV1 becomes greater than or equal to +DevCondAlmax5 and DEV2 becomes less than or equal to −DevDcAlmin5, the monitoring system SY1 detects (S16) a deterioration of the oil OL, namely light fuel pollution, which is representative of a malfunction or an abnormal condition of the engine.

Figure 12:
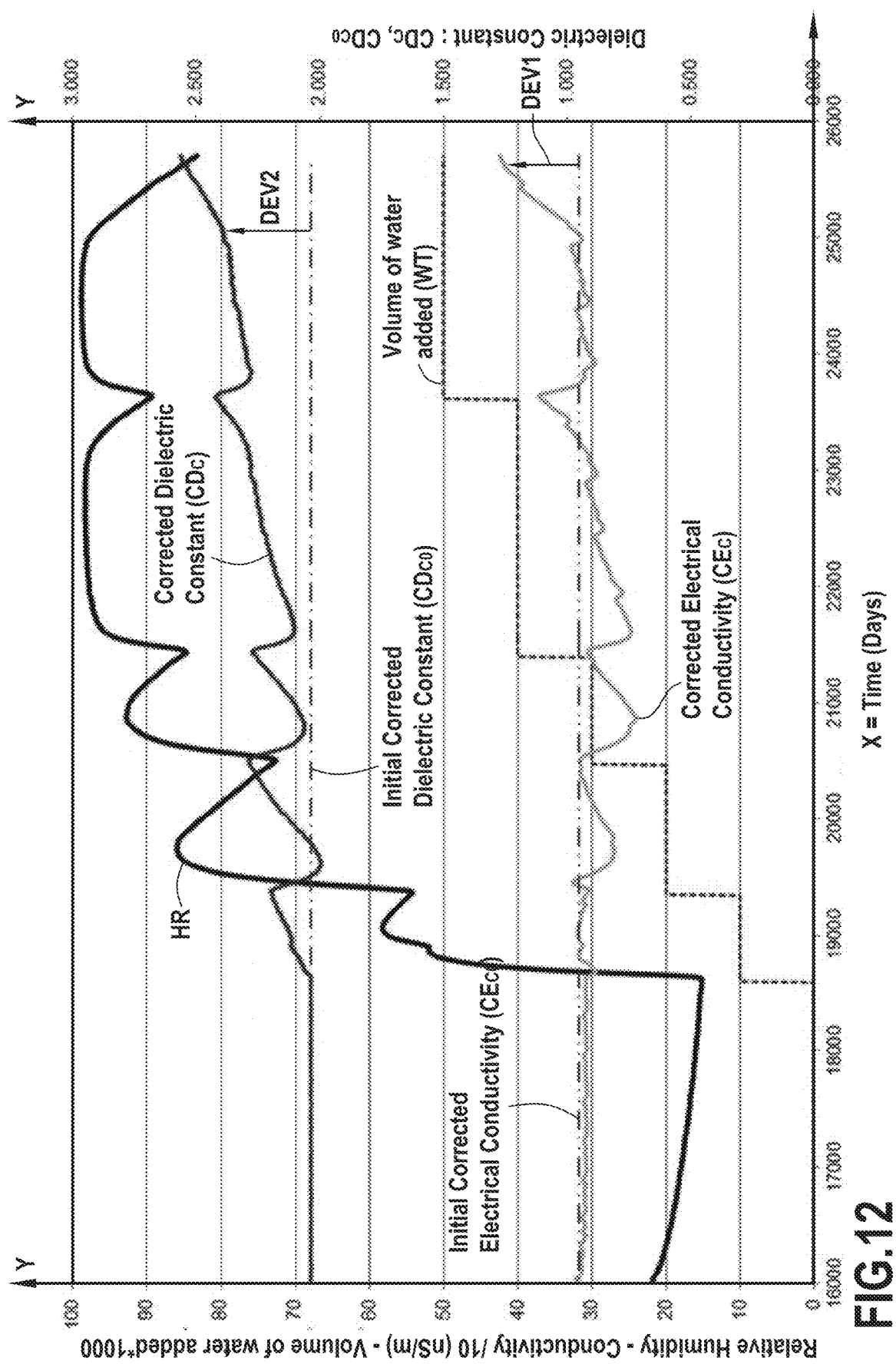
FIG. 12 schematically represents the evolution of parameters processed by a monitoring system, according to a particular embodiment of the invention.

For example, FIG. 12 represents a particular case where water and/or fuel pollution in the oil OL is detected as event EVT1EVT2. According to the rules RL represented in FIG. 10, the event EVT2 is detected if the following condition CN is fulfilled: the first deviation DEV1 of the corrected electrical conductivity CEc with respect to the initial corrected electrical conductivity CEc0 is greater than or equal to a maximum threshold noted −DevDCAlmin3.

According to a specific example, DevDCAlmin3 is equal to −5 or even −3.

As shown in FIG. 12, it is assumed for example that water pollution appears in the lubricating oil OL circulating in the main oil circuit C1. This water pollution is an indication of excessive oil viscosity in this particular case and a possible deterioration of the engine 8, including the TBN of the oil. TBN is the Total Base Number, expressed in mg KOH/g oil, which characterizes the alkalinity reserve of the oil, and therefore its capacity to neutralize combustion acids. The TBN parameter is particularly representative of the condition of engine oils, especially diesel, especially when used with a high-sulfur fuel.

In this example, the addition of water to the oil OL is expressed by an increase over time in the first deviation DEV1. Although an increase in the second deviation DEV2 is also detectable when the amount of added water increases, it has been observed that taking this parameter into account is not necessary in this particular case to detect water pollution in the OL oil.

Upon detection that the deviation DEV2 becomes less than or equal to −DevCondAlmax1, the monitoring system SY1 detects (S16) a deterioration of the oil OL, namely water pollution, which represents a malfunction or an abnormal state of the engine.

Note that contamination of the oil OL with water can also be detected as an event EVT0 (FIG. 10) by establishing if the relative humidity HR is greater than or equal to a maximum threshold noted HRAlmax0.

According to a specific example, the detection unit U3 is set up pursuant to the rules RL to detect the following EVT events:
detection of an abnormal TBN level and/or viscosity of the oil OL if the first deviation DEV1 reaches the first minimum threshold −DevCondAlmin1 (EVT1);
detection of a potential fuel contamination of the oil OL with an abnormal TBN and/or viscosity level if the first deviation DEV1 reaches a second maximum threshold +DevCondAlmax2 (EVT2);
detection of oil contamination potentially to fuel or other if the second deviation DEV2 reaches a third minimum threshold −DevDCAlmin3 (EVT3); and
detection of contamination of the oil OL potentially to combustion soot if the second deviation DEV2 reaches a fourth maximum threshold +DevDCAlmax4 (EVT4).

According to a specific example, the detection unit U3 is set up pursuant to the rules RL to detect the following EVT events:
detection of a potential pollution of the oil OL with light fuel (or light fuel oil) if the first deviation DEV1 reaches a fifth maximum threshold +DevCondAlmax5 and if the second deviation DEV2 reaches a sixth minimum threshold −DevDCAlmin5 (EVT5);
detection of a potential heavy fuel oil pollution if the first deviation DEV1 reaches a seventh maximum threshold +DevCondAlmax6 and if the second deviation DEV2 reaches an eighth maximum threshold +DevDCAlmax6 (EVT6); and
potential detection of an abnormal iron content (or abnormal rate) in the oil OL if the relative humidity HR reaches a ninth maximum threshold HRAlmax7, if the first deviation DEV1 reaches a tenth maximum threshold +DevCondAlmax7 and if the second deviation DEV2 reaches an eleventh maximum threshold +DevDCAlmax7 (EVT7).

Any combination of the rules RL described above can be implemented.

Furthermore, as already indicated, calibration S4 (FIG. 2) may be necessary during an initial configuration S2 prior to steps S8-18 in order to establish the final polynomial functions f3CE and f3CD, and more particularly their respective coefficients CFCE and CFCD. This makes it possible to calculate the corrected electrical conductivity CEc and the corrected dielectric constant CDc.

As a reminder, the parameters CEc and CDc under consideration here are defined as follows:

$$CEc = [(a6 \cdot T^6 + a5 \cdot T^5 + a4 \cdot T^4 + a3 \cdot T^3 + a2 \cdot T^2 + a1 \cdot T + a0) + (b6 \cdot P^6 + b5 \cdot P^5 + b4 \cdot P^4 + b3 \cdot P^3 + b2 \cdot P^2 + b1 \cdot P + b0) + (c6 \cdot HR^6 + c5 \cdot HR5 + c4 \cdot HR^4 + c3 \cdot HR^3 + c2 \cdot HR^2 + c1 \cdot HR + c0)] \cdot CE$$

$$CDc = [(d6 \cdot T^6 + d5 \cdot T^5 + d4 \cdot T^4 + d3 \cdot T^3 + d2 \cdot T^2 + d1 \cdot T + d0) + (e6 \cdot P^6 + e5 \cdot P^5 + e4 \cdot P^4 + e3 \cdot P^3 + e2 \cdot P^2 + e1 \cdot P + e0) + (f6 \cdot HR^6 + f5 \cdot HR^5 + f4 \cdot HR^4 + f3 \cdot HR^3 + f2 \cdot HR^2 + f1 \cdot HR + f0)] \cdot CD$$

The coefficients a0-a6 (noted collectively CFCE-T) define a correction CRCE-T applied on the electrical conductivity CE as a function of temperature T.

The coefficients b0-b6 (collectively noted CFCE-P) define a CRCE-P correction applied on the electrical conductivity CE as a function of the pressure P.

The coefficients c0-c6 (collectively noted CFCE-HR) define a CRCE-HR correction applied on the electrical conductivity CE as a function of the relative humidity HR.

Similarly, the coefficients d0-d6 (noted collectively as CFCD-T) define a CRCD-T correction applied to the dielectric constant CD as a function of temperature T.

The coefficients e0-e6 (noted collectively as CFCD-P) define a CRCD-P correction applied to the dielectric constant CD as a function of pressure P.

The coefficients f0-f6 (noted collectively CFCD-HR) define a CRCD-HR correction applied on the dielectric constant CD as a function of the relative humidity HR.

Figure 13:
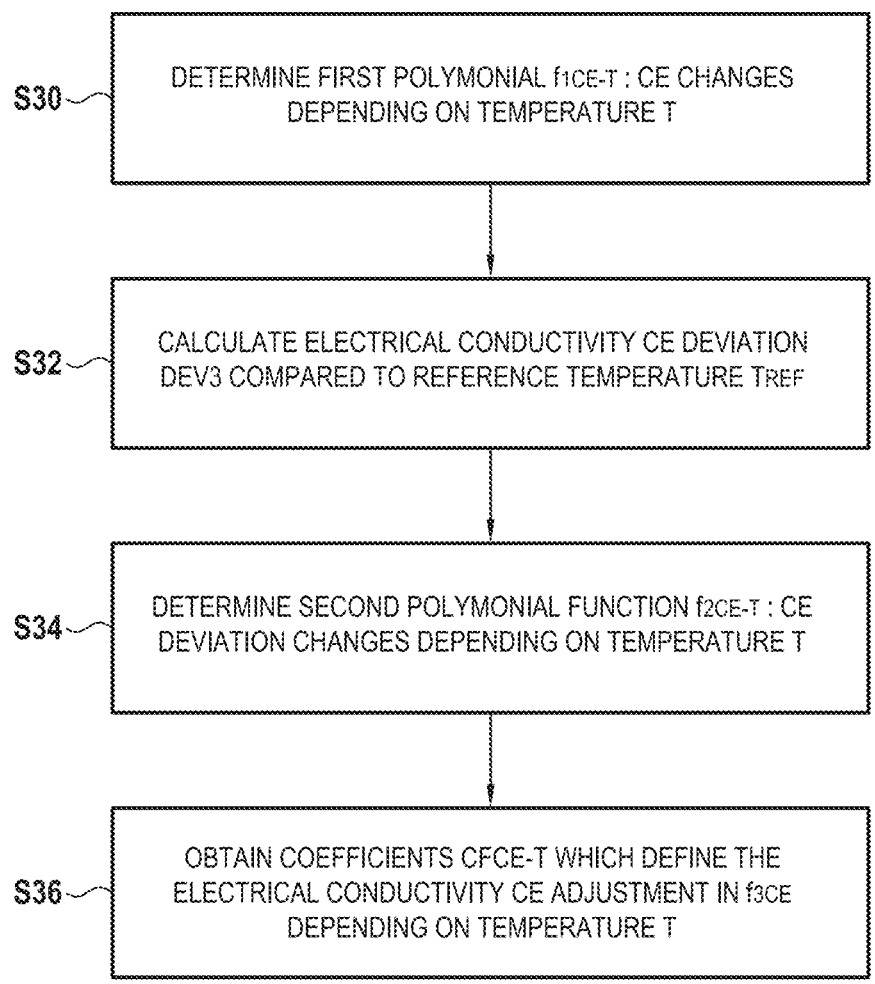
FIG. 13 represents schematically, in the form of a diagram, the steps of a process implemented by a monitoring system, according to a particular embodiment of the invention.

FIG. 13 represents, according to a specific embodiment, the steps performed by the calibration unit U5 to determine the coefficients CFCE-T (a0 to a6) defining the polynomial correction CRCE-T applied in the final polynomial function f3CE on the electrical conductivity CE as a function of the temperature T, for each order from 1 to 6 (the principle described here is similarly applicable to a polynomial function f3CE and f3CD of a different range, n=4 for example).

More specifically, during a determination step S30, the calibration unit U5 establishes the evolution of the electrical conductivity CE measured (mathematical model of CE) by the sensors SN as a function of the temperature T measured by the sensors SN. For this purpose, the calibration unit U5 receives (in the form of signals SG1) electrical conductivity values CE measured by the sensor unit U1 at different temperatures. Based on these values, the calibration unit U5 determines (S30) a first polynomial function f1CE representing the evolution of the lubricating oil OL's electrical conductivity CE as a function of the temperature T.

Figure 14:
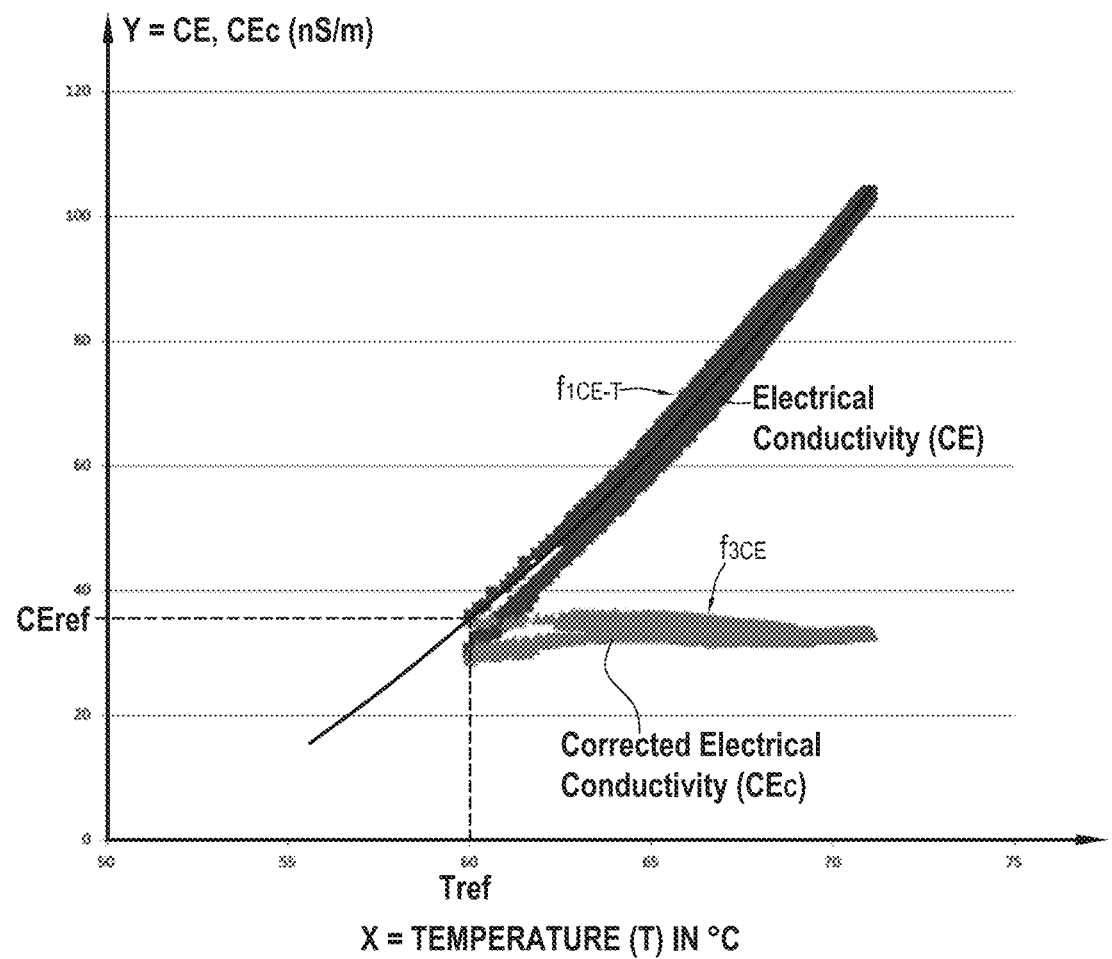
FIG. 14 schematically represents the evolution of parameters processed by a monitoring system, according to a particular embodiment of the invention.

FIG. 14 shows an example of this first polynomial function f1CE-T determined in S30 by the calibration unit U5. This function f1CE is established by performing a polynomial regression from the previously obtained value pairs [CE, T].

During a calculation step S32 (FIG. 13), the calibration unit U5 determines a deviation noted DEV3, as a function of the temperature T, of the electrical conductivity CE compared to a reference electrical conductivity noted CEref. This reference electrical conductivity CEref is the electrical conductivity CE defined by the function f1CE-T for a predefined reference temperature Tref. This temperature Tref defines a temperature at which the correction CRCE-T applied on the electrical conductivity CE to obtain a corrected electrical conductivity CEc must be zero. The reference temperature Tref can be chosen for example between 50° C. and 85° C. In this example, the reference temperature Tref is equal to 60° C., the approximate temperature of engine 8 in normal operation.

Figure 15:
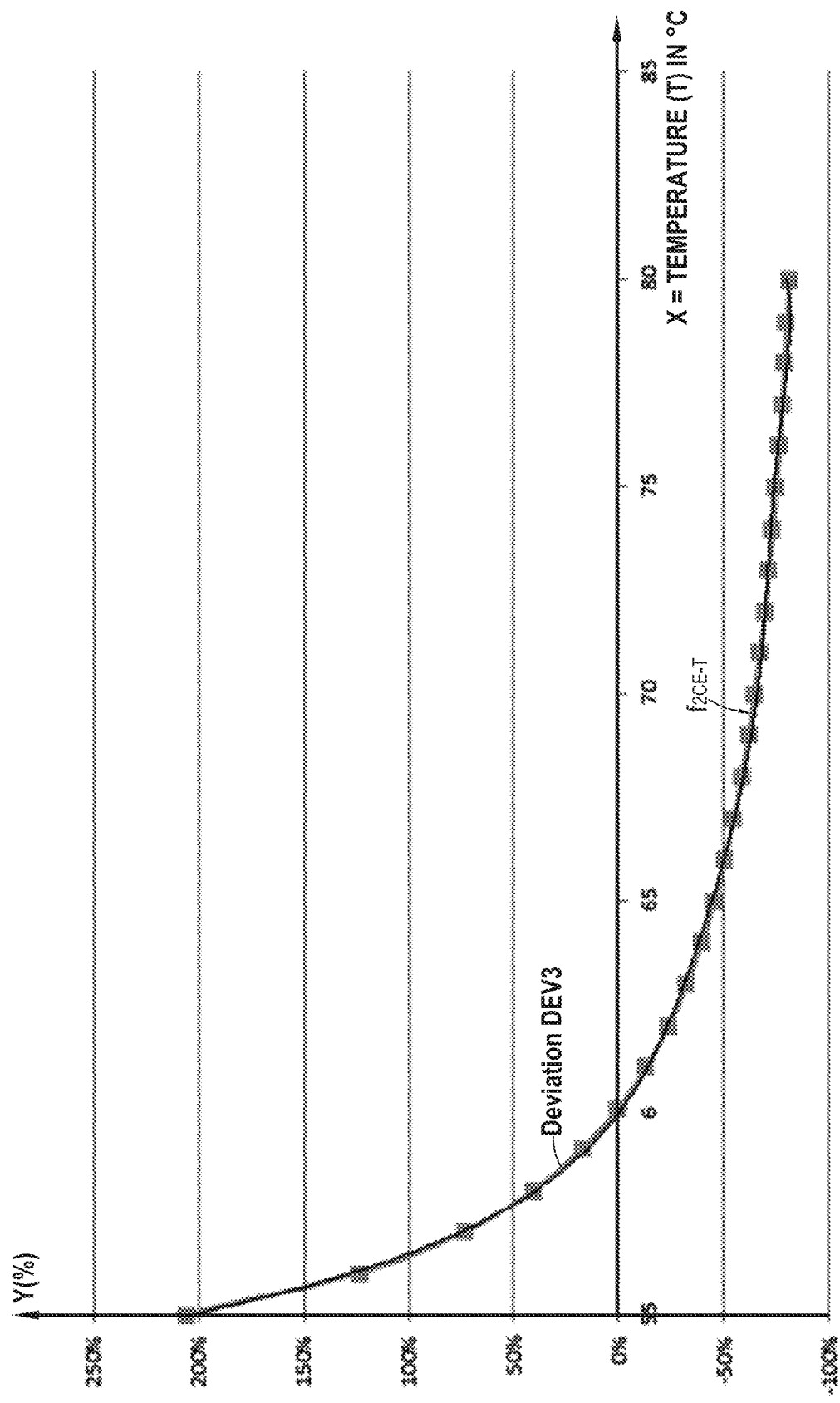
FIG. 15 schematically represents the evolution of parameters processed by a monitoring system, according to a particular embodiment of the invention.

As shown in FIG. 15, the calibration module U5 then establishes (S34, FIG. 13) from the first polynomial function f1CE-T, and more particularly from the deviation DV3 calculated in S32 as a function of the temperature T, a second polynomial function f2CE-T representing the evolution of the deviation DV3 as a function of the temperature T.

This second polynomial function f2CE-T defines the correction CRCE-T applied by the final polynomial function f3CE as a function of the temperature T. This second function f2CE-T is weighted by the coefficients a0-a6 defining the CRCE-T correction applied by the final polynomial function f3CE on the electrical conductivity CE as a function of temperature, so that this CRCE-T correction is zero at the reference temperature Tref.

The calibration unit U5 obtains (extracts) in S36 the CFCE-T coefficients (a0-a6) to be applied in the first final polynomial function f3CE to calculate the corrected electrical conductivity CEc.

The other CFCE coefficients (namely b0-b6 and c0-c6) of the function f3CE as well as the CFCD coefficients (d0-d6, e0-e6 and f0-f6) of the function f3CD are also determined by the calibration unit U5 by similarly applying the steps S30-S36 described above. Namely, a first polynomial function and then a second polynomial function are determined in order to deduce the coefficients defining respectively the corrections CRCE-P and CRCE-HR in the first final polynomial function f3CE and the corrections CRCD-T, CRCD-P and CRCD-HR in the second final polynomial function f3CD.

Therefore calibration unit U5 performs the following operations similarly to step S30:

determining a first polynomial function f1CE-P representing the evolution of the electrical conductivity CE measured by the sensors SN as a function of the pressure P measured by the sensors SN;

determining a first polynomial function f1CE-HR representing the evolution of the electrical conductivity CE measured by the sensors SN as a function of the relative humidity HR measured by the sensors SN;

determining a first polynomial function f1CD-T representing the evolution of the dielectric constant CD measured by the sensors SN as a function of the temperature T measured by the sensors SN;

determining a first polynomial function f1CD-P representing the evolution of the dielectric constant CD measured by the sensors SN as a function of the pressure P measured by the sensors SN;

determining a first polynomial function f1CD-HR representing the change in the dielectric constant measured by at least one sensor as a function of the relative humidity measured by at least one sensor;

Calibration unit U5 then performs the following operations similarly to steps S32-S34:

using the first polynomial function f1CE-P to determine a second polynomial function f2CE-P defining a correction CRCE-P of the electrical conductivity as a function of the pressure P. This second polynomial function f2CE-P is weighted by the coefficients CFCE-T (b0-b6) defining the correction CRCE-P so that it is zero at a reference pressure Pref;

using the first polynomial function f1CE-HR to determine a second polynomial function f2CE-HR defining a correction of the electrical conductivity CE as a function of the relative humidity HR. This second polynomial function f2CE-HR is weighted by the coefficients CFCE-HR (b0-b6) defining the correction CFCE-HR so that it is zero at a reference relative humidity HRref;

using the first polynomial function f1CD-T to determine a second polynomial function f2CD-T defining a correction CRCD-T of the dielectric constant CD as a function of temperature T. This second polynomial function f2CD-T is weighted by the coefficients CFCD-T (d0-d6) defining the correction CFCD-T so that it is zero at the reference temperature Tref;

using the first polynomial function f1CD-P to determine a second polynomial function f2CD-P defining a correction CRCD-P of the dielectric constant CD as a function of the pressure P. This second polynomial function f2CD-P is weighted by the coefficients CFCD-0 (e0-e6) defining the correction CRCD-P so that it is zero at a reference pressure Pref;

using the first polynomial function f1CD-HR to determine a second polynomial function f2CD-HR defining a correction CRCD-HR of the dielectric constant CD as a function of the relative humidity HR. This second polynomial function f2CD-HR is weighted by the coefficients CFCD-HR (f0-f6) defining the correction CFCD-HR so that it is zero at a reference relative humidity HRref.

In the example considered here, the reference pressure Pref is between 0.5 and 10 bars, or even between 3 and 5 bars. Pref is for example equal to 4 bars. Furthermore, the reference relative humidity HR is between 2% and 60%, or even between 5% and 25%. HRref is for example equal to 15%.

The polynomial coefficients CFCE and CFCD are chosen here so that the respective correction applied to CE and CD by the final polynomial functions f3CE and f3CD is zero for the reference temperature Tref, the reference pressure Pref and the reference relative humidity HRref.

The steps described above allow the calibration unit U5 to automatically establish the value of the coefficients CFCE and CFCD in the calibration step S4 (FIG. 2). The analysis module U2 applies the coefficients CFCE and CFCD in the final polynomial functions f3CE and f3CD, respectively, to establish the corrected electrical conductivity CEc and the corrected dielectric constant CDc as second parameters PR2 in the processing S12.

However, there are other ways to implement calibration S4. Furthermore, the implementation of the calibration step S4 is not always necessary. Alternatively, a person skilled in the art can define each of the CFCE and CFCD coefficients themselves.

In general, a person skilled in the art will understand that the embodiments and variants described above are only non-limiting examples of implementation of the invention. In particular, the person skilled in the art will be able to consider any adaptation or combination of the above-described embodiments and variants in order to meet a very particular need, the invention being defined in the following claims.

It should be noted in particular that the order in which the steps of the process of the invention as described in the above embodiments and variants follow one another is only an example of an embodiment, variations are possible.

The invention claimed is:

1. A monitoring system for monitoring an engine comprising:
a sensor unit connected to an inlet line and an outlet line, the inlet line includes a hydraulic pipe connector set up to connect to one of the engine's oil circuits, the sensor unit has at least one sensor set up to measure first parameters representing the quality of an engine lubricating oil taken from the oil circuit via the inlet line, the outlet line is adapted to discharge the oil from the sensor unit into the oil circuit;
an analysis unit configured to determine, from the first parameters or second parameters obtained by processing the first parameters, whether at least one predefined condition is met, by comparing the first or second parameters with at least one threshold value; and
a detection unit configured to detect a degradation of the oil quality representative of an abnormal state of the engine, when at least one predefined condition is met;
wherein the processing performed by the analysis unit performs at least one of the following:
determining, as a second parameter, a corrected electrical conductivity from an electrical conductivity measured by the at least one sensor by applying a first final polynomial function, the first final polynomial function defines the corrected electrical conductivity from the electrical conductivity, temperature, pressure and relative humidity measured by the at least one sensor, the first final polynomial function is weighted by first coefficients associated respectively with the temperature, the pressure and the relative humidity to compensate at least in part for the respective influence of the temperature, the pressure and the relative humidity on the electrical conductivity measured by the at least one sensor; and
determining, as a second parameter, a corrected dielectric constant from a dielectric constant measured by the at least one sensor by applying a second final polynomial function, the second final polynomial function defines the corrected dielectric constant from the dielectric constant, the temperature, the pressure and the relative humidity measured by the at least one sensor, the second final polynomial function is weighted by second coefficients associated respectively with the temperature, the pressure and the relative humidity in order to compensate at least in part for the respective influence of the temperature, the pressure and the relative humidity on the dielectric constant measured by the at least one sensor;
wherein the analysis unit is configured to compare at least one of the corrected electrical conductivity and the corrected dielectric constant with a respective threshold to determine whether at least one predefined condition is met.

2. The system pursuant to claim 1, including: —a control unit configured to initiate at least one predefined action to protect the engine when it detects at least one form of deterioration in the oil quality.

3. The system pursuant to claim 2, wherein the at least one predefined action comprises at least any one of: —sending or presenting a notification representative of oil quality degradation; and —initiating a command from a control unit to change at least one engine operating setting.

4. The system pursuant to claim 1, wherein the first parameters measured by the at least one sensor include the following parameters:—electrical conductivity of the oil; —dielectric constant of the oil; —temperature of the oil; —oil pressure; and —relative humidity of the oil.

5. The system pursuant to claim 1, wherein the first parameters include at least one parameter characterizing metallic particles that are found in the oil.

6. The system pursuant to claim 1, wherein the analysis unit is set up to establish the corrected electrical conductivity and the corrected dielectric constant after the processing, wherein the at least one predefined condition comprising the following conditions: —the corrected electrical conductivity reaches a first threshold; and —the corrected dielectric constant reaches a second threshold.

7. The system pursuant to claim 1, including a calibration unit configured to determine, prior to the analysis, the first and second coefficients weighting respectively the first and second final polynomial functions, the calibration unit is configured to perform the following steps:
  determining a first polynomial function f1CE-T representing the change in the electrical conductivity measured by the at least one sensor as a function of the temperature measured by at the least one sensor;
  determining a first polynomial function fiCE-P representing the change in the electrical conductivity measured by the at least one sensor as a function of the pressure measured by the at least one sensor;
  determining a first polynomial function fiCE-HR representing the change in the electrical conductivity measured by the at least one sensor as a function of the relative humidity measured by the at least one sensor;
  determining a first polynomial function f1CD-T representing the change in the dielectric constant measured by the at least one sensor as a function of the temperature measured by the at least one sensor;
  determining a first polynomial function fICD-P representing the change in the dielectric constant measured by the at least one sensor as a function of the pressure measured by the at least one sensor;
  determining a first polynomial function f1CD-HR representing the change in the dielectric constant measured by the at least one sensor as a function of the relative humidity measured by the at least one sensor;
  using the first polynomial function f1CE-T to determine a second polynomial function f2CE-T defining a correction CRCE-T of the electrical conductivity as a function of the temperature, the second polynomial function f2CE-T is weighted by the first coefficients defining the correction CRCE-T so that it is zero at a reference temperature;
  using the first polynomial function fiCE-P to determine a second polynomial function f2CE-P defining a correction CRCE-P of the electrical conductivity as a function of the pressure, the second polynomial function f2CE-P is weighted by the first coefficients defining the correction so that it is zero at a reference pressure;
  using the first polynomial function fiCE-HR to determine a second polynomial function f2CE-HR defining a correction CRCE-HR of the electrical conductivity as a function of the relative humidity, the second polynomial function f2CE-HR is weighted by the first coefficients defining the correction so that it is zero at a reference relative humidity;
  using the first polynomial function f1CD-T to determine a second polynomial function f2CD-T defining a correction CRCD-T of the dielectric constant as a function of temperature, the second polynomial function f2CD-T is weighted by the second coefficients defining the correction so that it is zero at the reference temperature;
  using the first polynomial function fICD-P to determine a second polynomial function f2CD-P defining a correction CRCD-P of the dielectric constant as a function of pressure, the second polynomial function f2CD-P is weighted by the second coefficients defining the correction so that it is zero at the reference pressure; and
  using the first polynomial function fICD-HR to determine a second polynomial function f2CD-HR defining a CRCD-HR correction of the dielectric constant as a function of the relative humidity, the second polynomial function f2CD-HR is weighted by the second coefficients defining the correction so that it is zero at the reference relative humidity;
  wherein the analysis unit is set up to apply the first and second coefficients in the final first and second polynomial functions, respectively, to determine the corrected electrical conductivity and the corrected dielectric constant as second parameters after processing.

8. The system pursuant to claim 1, wherein the analysis unit is configured to perform during a learning phase: —determining a corrected initial electrical conductivity and a corrected initial dielectric constant from, respectively, the electrical conductivity and the dielectric constant measured by the at least one sensor in a reference state of the oil circuit; wherein the analysis unit is further configured to perform, during the processing: —calculating a first deviation between a corrected electrical conductivity determined at a current time from the corrected initial electrical conductivity and a second deviation between a corrected dielectric constant determined at a current time from the corrected initial dielectric constant; and —determining that at least one predefined condition is met when at least one of the first and second deviations reaches a predefined threshold.

9. The system pursuant to claim 8, wherein: —when the first deviation reaches a first predefined minimum threshold, the detection unit is configured to detect, as a deterioration of oil quality, an abnormal viscosity level of the oil; —when the first deviation reaches a second predefined maximum threshold, the detection unit is configured to detect, as a deterioration of the quality of the oil, a fuel pollution of the oil; —when the second deviation reaches a third predefined minimum threshold, the detection unit is configured to detect, as a deterioration of the quality of the oil, soot pollution of the oil; and —when the second deviation reaches a fourth predefined maximum threshold, the detection unit is configured to detect, as a deterioration of the oil quality, an anomalous alkalinity level of the oil.

10. System pursuant to claim 8, wherein: —when the first deviation reaches a fifth predefined maximum threshold and when the second deviation reaches a sixth predefined minimum threshold, the detection unit is configured to detect, as a deterioration of the oil quality, a first fuel oil pollution value of the oil; —when the first deviation reaches a predefined maximum seventh threshold and the second deviation reaches a predefined maximum eighth threshold, the detection unit is configured to detect as a deterioration of the oil quality a second fuel pollution value of the oil; and —when the relative humidity reaches a ninth predefined maximum threshold, the first deviation reaches a tenth predefined maximum threshold and the second deviation reaches an eleventh predefined maximum threshold, the detection unit is configured to detect, as a deterioration of the quality of the oil, an anomalous iron content of the oil.

11. Engine system, including: —an oil circuit with an engine, a pump configured to inject an engine lubricating oil into the engine, and a sump configured to collect the engine lubricating oil discharged from the engine; and —a monitoring system as defined in claim 1, the connector of the inlet line is connected to the oil circuit so as to sample engine lubricating oil flowing in the oil circuit, and wherein the outlet line is configured to discharge the lubricating oil into the sump.

12. The engine system of claim 11, wherein the oil circuit further comprises an oil filter positioned between the pump and the engine, the connector of the inlet line is connected to the oil circuit at a tapping point located:
between the pump and the oil filter so as to be downstream of the pump and upstream of the engine; or
between the pump and the engine so as to be downstream of the engine and upstream of the pump.

13. A method for monitoring an engine, implemented by a monitoring system comprising at least one sensor and being connected via an inlet line to one of the engine's oil circuits, the method does the following:

measuring, by the at least one sensor, first parameters representing the quality of an engine lubricating oil taken from the oil circuit via the inlet pipe, the oil is discharged after the measurement into the oil circuit via an outlet pipe of the monitoring system;

an analysis based on the first parameters or second parameters obtained by processing the first parameters to determine whether at least one predefined condition is met, by comparing the first or second parameters with at least one threshold value; and detection of at least one predefined deterioration of the oil quality representative of an abnormal state of the engine when at least one predefined condition is met; wherein the processing performed includes at least one of the following:

determining, as a second parameter, a corrected electrical conductivity from an electrical conductivity measured by the at least one sensor by applying a first final polynomial function, the first final polynomial function defines the corrected electrical conductivity from the electrical conductivity, temperature, pressure and relative humidity measured by the at least one sensor, the first final polynomial function is weighted by first coefficients associated respectively with the temperature, the pressure and the relative humidity to compensate at least in part for the respective influence of the temperature, the pressure and the relative humidity on the electrical conductivity measured by the at least one sensor; and determining, as a second parameter, a corrected dielectric constant from a dielectric constant measured by the at least one sensor by applying a second final polynomial function, the second final polynomial function defines the corrected dielectric constant based on the dielectric constant, the temperature, the pressure and the relative humidity measured by the at least one sensor, the second final polynomial function is weighted by second coefficients associated respectively with the temperature, the pressure and the relative humidity to compensate at least in part for the respective influence of the temperature, the pressure and the relative humidity on the dielectric constant measured by the at least one sensor;

wherein the analysis compares at least one of the corrected electrical conductivity and the corrected dielectric constant with a respective threshold to determine whether at least one predefined condition is met.

* * * * *